(12) United States Patent
Randazza et al.

(10) Patent No.: US 8,701,986 B2
(45) Date of Patent: *Apr. 22, 2014

(54) PAYMENT SYSTEM AND METHODS

(71) Applicant: National Payment Card Association, Coconut Creek, FL (US)

(72) Inventors: Joseph R. Randazza, Boca Raton, FL (US); Danilo Portal, Miramar, FL (US)

(73) Assignee: National Payment Card Association, Coconut Creek, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,310

(22) Filed: May 31, 2013

(65) Prior Publication Data

US 2013/0268381 A1    Oct. 10, 2013

Related U.S. Application Data

(63) Continuation of application No. 13/469,673, filed on May 11, 2012, now Pat. No. 8,490,865, which is a continuation of application No. 13/163,216, filed on Jun. 17, 2011, now Pat. No. 8,205,791, which is a continuation-in-part of application No. 12/851,079, filed on Aug. 5, 2010, now Pat. No. 7,988,040, which is a continuation of application No. 11/938,279, filed on Nov. 10, 2007, now Pat. No. 7,793,829, which is a continuation-in-part of application No. 11/692,172, filed on Mar. 27, 2007, now abandoned, which is a continuation-in-part of application No. 11/539,636, filed on Oct. 8, 2006, now abandoned.

(60) Provisional application No. 60/786,830, filed on Mar. 29, 2006, provisional application No. 60/724,806, filed on Oct. 11, 2005, provisional application No. 60/791,217, filed on Apr. 12, 2006.

(51) Int. Cl.
*G06Q 40/00* (2012.01)

(52) U.S. Cl.
USPC .......................... 235/379; 235/380; 235/375

(58) Field of Classification Search
USPC .................... 235/379, 380, 375, 487, 472.01; 705/17, 34, 39

See application file for complete search history.

(56) References Cited

U.S. PATENT DOCUMENTS

| | | |
|---|---|---|
| 5,490,251 A | 2/1996 | Clark et al. |
| 6,505,772 B1 | 1/2003 | Mollett et al. |
| 6,678,664 B1 | 1/2004 | Ganesan |
| 6,814,282 B2 | 11/2004 | Seifert et al. |
| 6,827,260 B2 | 12/2004 | Stoutenburg et al. |
| 6,847,947 B1 | 1/2005 | Kambour et al. |
| 6,854,642 B2 | 2/2005 | Metcalf et al. |
| 6,886,742 B2 | 5/2005 | Stoutenburg et al. |
| 7,020,633 B2 | 3/2006 | Strayer et al. |
| 7,043,451 B2 | 5/2006 | Strayer et al. |
| 7,069,244 B2 | 6/2006 | Strayer et al. |
| 7,070,092 B2 | 7/2006 | Phillips et al. |
| 7,086,584 B2 | 8/2006 | Stoutenburg et al. |

(Continued)

OTHER PUBLICATIONS

Best Practices, Best Practices Recommendations for the Use of Magnetic Stripes, Version 2.0, Apr. 1996.

(Continued)

*Primary Examiner* — Edwyn Labaze
(74) *Attorney, Agent, or Firm* — Whitham Curtis Christofferson & Cook, PC

(57) ABSTRACT

Disclosed are payment system and methods.

14 Claims, 20 Drawing Sheets

(56) References Cited

U.S. PATENT DOCUMENTS

| | | |
|---|---|---|
| 7,092,916 B2 | 8/2006 | Diveley et al. |
| 7,096,205 B2 | 8/2006 | Hansen et al. |
| 7,103,577 B2 | 9/2006 | Blair et al. |
| 7,104,440 B2 | 9/2006 | Hansen et al. |
| 7,104,443 B1 | 9/2006 | Paul et al. |
| 7,107,249 B2 | 9/2006 | Dively et al. |
| 7,158,955 B2 | 1/2007 | Diveley et al. |
| 7,232,060 B2 | 6/2007 | Ahles et al. |
| 7,315,843 B2 | 1/2008 | Diveley et al. |
| 7,350,697 B2 | 4/2008 | Swift et al. |
| 7,366,695 B1 | 4/2008 | Allen-Rouman et al. |
| 7,455,220 B2 | 11/2008 | Phillips et al. |
| 7,506,809 B2 | 3/2009 | Stoutenburg et al. |
| 7,533,814 B2 | 5/2009 | Martinez |
| 7,543,736 B2 | 6/2009 | Swift et al. |
| 7,600,673 B2 | 10/2009 | Stoutenburg et al. |
| 7,611,046 B2 | 11/2009 | Ahles et al. |
| 7,613,655 B2 | 11/2009 | Hansen et al. |
| 7,689,508 B2 | 3/2010 | Davis et al. |
| 7,720,755 B1 | 5/2010 | Coyle |
| 7,774,231 B2 | 8/2010 | Pond et al. |
| 7,784,684 B2 | 8/2010 | Labrou et al. |
| 7,793,829 B2 | 9/2010 | Randazza et al. |
| 7,822,688 B2 | 10/2010 | Labrou et al. |
| 7,831,520 B2 | 11/2010 | Mengerink |
| 7,848,977 B2 | 12/2010 | McCarthy et al. |
| 7,848,980 B2 | 12/2010 | Carlson |
| 7,882,021 B2 | 2/2011 | Baumgartner et al. |
| 7,933,799 B2 | 4/2011 | Aaltonen et al. |
| 7,937,299 B1 | 5/2011 | Ahles et al. |
| 8,015,085 B2 | 9/2011 | Blagg et al. |
| 8,231,055 B2 | 7/2012 | Wen |
| 8,235,287 B2 | 8/2012 | Mckelvey |
| 8,255,303 B2 | 8/2012 | Scipioni |
| 8,321,338 B2 | 11/2012 | Baumgart et al. |
| 8,538,870 B2 | 9/2013 | Allen-Rouman et al. |
| 2002/0052841 A1 | 5/2002 | Guthrie et al. |
| 2002/0116331 A1 | 8/2002 | Cataline et al. |
| 2003/0055783 A1 | 3/2003 | Cataline et al. |
| 2003/0078864 A1 | 4/2003 | Hardesty et al. |
| 2003/0149662 A1 | 8/2003 | Shore |
| 2003/0183689 A1 | 10/2003 | Swift et al. |
| 2003/0187786 A1 | 10/2003 | Swift et al. |
| 2003/0187790 A1 | 10/2003 | Swift et al. |
| 2003/0187796 A1 | 10/2003 | Swift et al. |
| 2004/0078332 A1 | 4/2004 | Ferguson et al. |
| 2004/0117254 A1 | 6/2004 | Nemirofsky et al. |
| 2004/0117255 A1 | 6/2004 | Nemirofsky et al. |
| 2004/0205011 A1 | 10/2004 | Northington et al. |
| 2005/0017898 A1 | 1/2005 | Teranishi |
| 2006/0116892 A1 | 6/2006 | Grimes et al. |
| 2006/0253335 A1 | 11/2006 | Keena et al. |
| 2006/0273165 A1 | 12/2006 | Swift et al. |
| 2007/0005496 A1 | 1/2007 | Cataline et al. |
| 2007/0005498 A1 | 1/2007 | Cataline et al. |
| 2007/0162387 A1 | 7/2007 | Cataline et al. |
| 2007/0233615 A1 | 10/2007 | Tumminaro |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2007/0293155 A1 | 12/2007 | Liao et al. |
| 2008/0011825 A1 | 1/2008 | Giordano et al. |
| 2008/0040265 A1 | 2/2008 | Rackley et al. |
| 2008/0048022 A1 | 2/2008 | Vawter |
| 2008/0116268 A1 | 5/2008 | Swift et al. |
| 2008/0126145 A1 | 5/2008 | Rackley Iii et al. |
| 2008/0207234 A1 | 8/2008 | Arthur et al. |
| 2008/0208741 A1 | 8/2008 | Arthur et al. |
| 2008/0208742 A1 | 8/2008 | Arthur et al. |
| 2008/0208743 A1 | 8/2008 | Arthur et al. |
| 2008/0208744 A1 | 8/2008 | Arthur et al. |
| 2008/0214146 A1 | 9/2008 | Lincoln et al. |
| 2008/0255947 A1 | 10/2008 | Friedman |
| 2008/0319873 A1 | 12/2008 | Levchin et al. |
| 2008/0319874 A1 | 12/2008 | Levchin et al. |
| 2008/0319875 A1 | 12/2008 | Levchin et al. |
| 2008/0319899 A1 | 12/2008 | Levchin et al. |
| 2009/0036103 A1 | 2/2009 | Byerley et al. |
| 2009/0063312 A1 | 3/2009 | Hurst |
| 2009/0068982 A1 | 3/2009 | Chen et al. |
| 2009/0104888 A1 | 4/2009 | Cox |
| 2009/0106148 A1 | 4/2009 | Prada |
| 2009/0119190 A1 | 5/2009 | Realini |
| 2009/0265272 A1 | 10/2009 | Dill et al. |
| 2009/0320106 A1 | 12/2009 | Jones et al. |
| 2010/0042538 A1 | 2/2010 | Dheer et al. |
| 2010/0048226 A1 | 2/2010 | Owen et al. |
| 2010/0057624 A1 | 3/2010 | Hurt et al. |
| 2010/0125495 A1 | 5/2010 | Smith et al. |
| 2010/0125510 A1 | 5/2010 | Smith et al. |
| 2010/0312703 A1 | 12/2010 | Kulpati et al. |
| 2011/0000959 A1 | 1/2011 | Randazza et al. |
| 2011/0010289 A1 | 1/2011 | Kranzley |
| 2011/0071914 A1 | 3/2011 | Beasley et al. |
| 2011/0078081 A1 | 3/2011 | Pirzadeh et al. |
| 2011/0093351 A1 | 4/2011 | Afana |
| 2011/0246284 A1 | 10/2011 | Chaikin et al. |
| 2011/0321127 A1 | 12/2011 | Pitroda et al. |
| 2012/0005077 A1 | 1/2012 | Pitroda et al. |
| 2012/0023026 A1 | 1/2012 | Chen et al. |
| 2012/0030044 A1 | 2/2012 | Hurst |
| 2012/0130899 A1 | 5/2012 | Mcmonagle et al. |
| 2012/0303528 A1 | 11/2012 | Weiner et al. |

OTHER PUBLICATIONS

Radu, Cristian; Implementing Electronic Card Payment Systems. Published by Artech House, 2002. ISBN 1580533051, 9781580533058, p. 18.
U.S. Trademark Registration No. 3,938,676—Mark: Murpay.
"Blaming the Fed's Durbin Rule, Tempo Payments Prepares to Shut Down", Digital Transactions, Jul. 11, 2011, Web.
J. Green, "Tempo Planning to Conduct Mobile Decoupled Debit Pilot", Paymentssource, Dec. 10, 2010, Web, Sourcemedia, Inc.
B. Francella, "Pay-By-Text Takes Off for Murphy Oil USA", Convenience Store News, Oct. 3, 2011, Web.

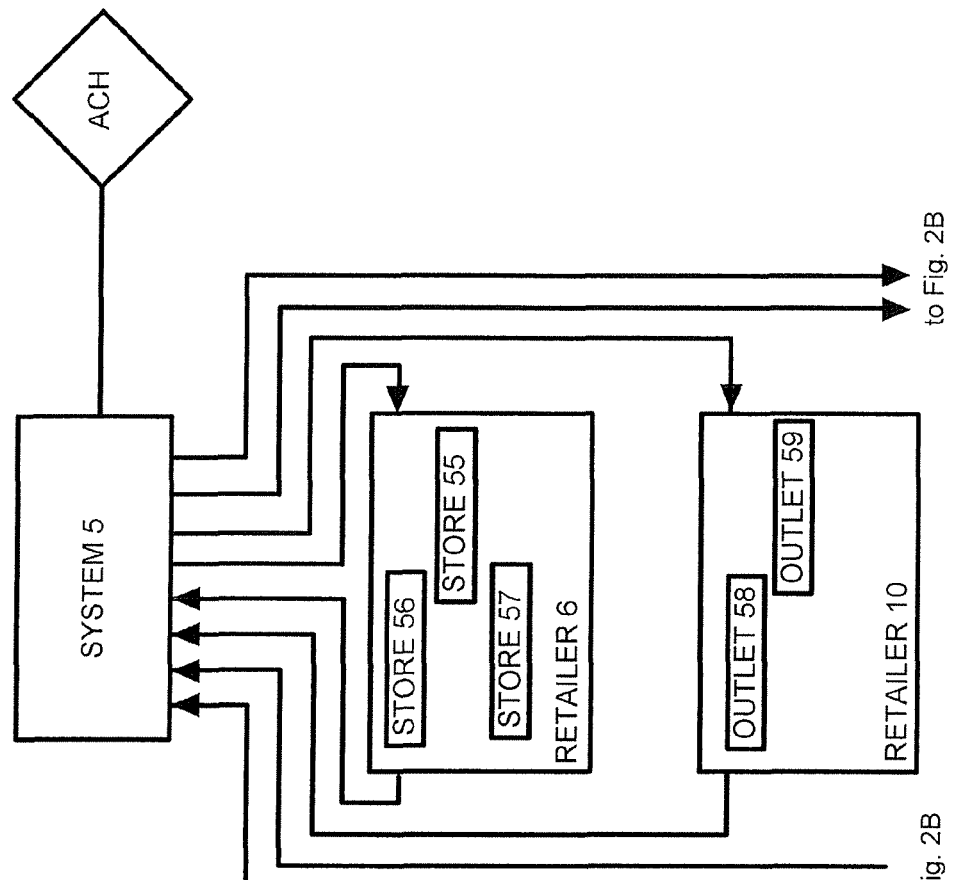

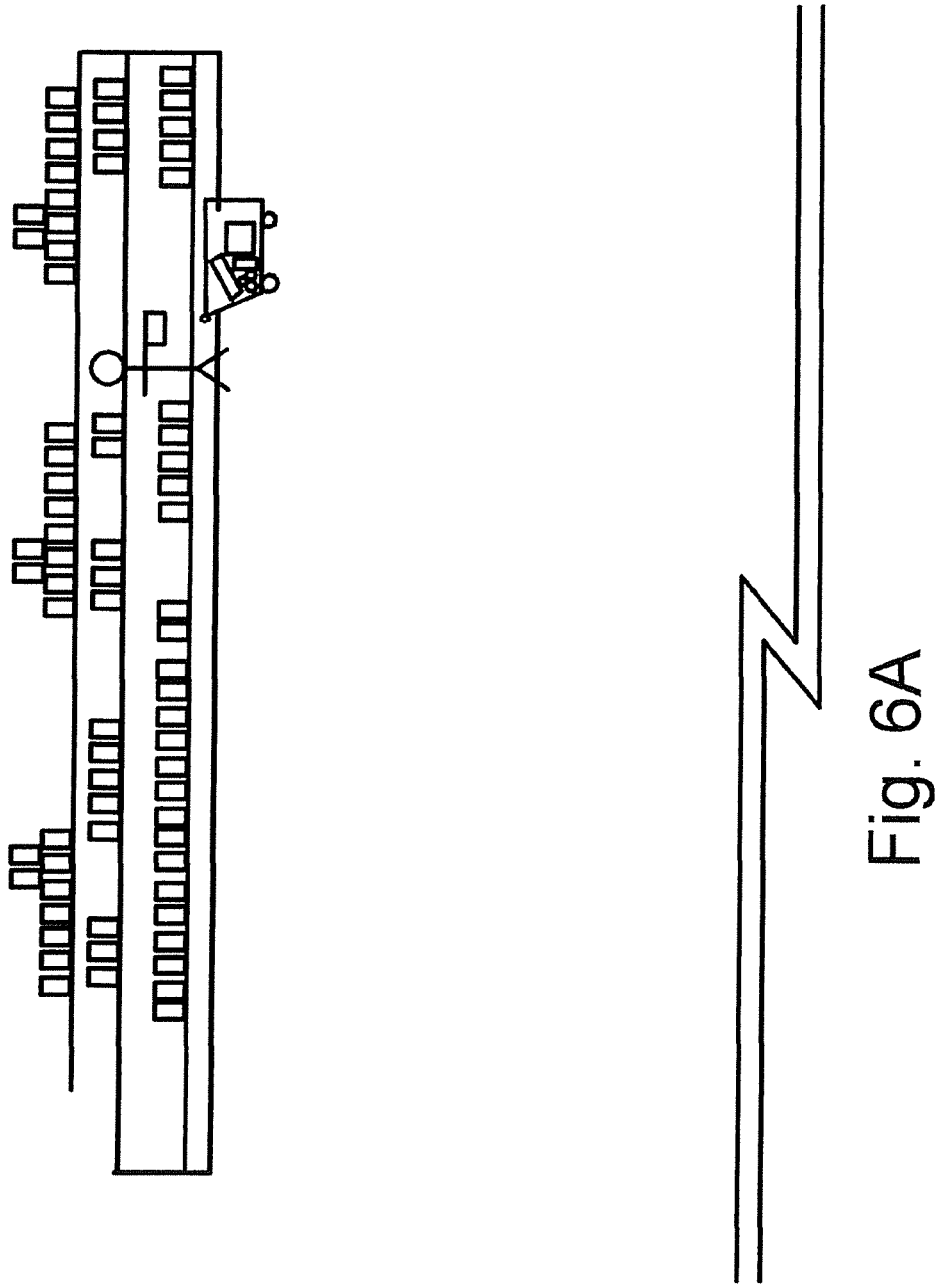

| CARD ID | ACCOUNT NUMBER | PIN |
| --- | --- | --- |
| [card ID 1] | 8373737780387 | 82798 |
| [card ID 2] | 5620886662888 | 82681 |
| [card ID of card 215] | 1937367750748 | 60186 |
| [card ID 4] | 7863580024136 | 40876 |
| . . . | | |
| [card ID n] | 7937767826975 | 29793 |

Fig. 9

| CARD ID | GROCERY THRESHOLD | GAS STATION THRESHOLD | RETAILER SET 3 THRESHOLD |
|---|---|---|---|
| [card ID 1] | 400 | 200 | 500 |
| [card ID 2] | 350 | 200 | 0 |
| [card ID of card 215] | 400 | 200 | 500 |
| [card ID 4] | 400 | 600 | 2000 |
| . | . | . | . |
| [card ID n] | 400 | 200 | 500 |

ID of retailer Safeway™, ID of retailer 6, ID of retailer Acme Grocery
ID of retailer 10, ID of Sunoco™, D of Shell™, ID of Texaco™
ID of Home Depot™, ID of Beta Hardware, ID of retailer 321

GROCERY GROUP LIST
GAS STATION GROUP LIST
RETAILER SET 3 GROUP LIST

| CARD ID | TRANSACTION DATE | RETAILER ID | AMOUNT |
| --- | --- | --- | --- |
| [card ID 1] | 23:12 December 12, 2006 | [ID of retailer 6] | $34.58 |
| [card ID 1] | 08:43 December 15, 2006 | [ID of retailer 12] | $12.75 |
| [card ID 215] | 22:12 December 7, 2006 | [ID of retailer 11] | $76.46 |
| [card ID 215] | 02:43 December 15, 2006 | [ID of Texaco] | $34.21 |
| [card ID 215] | 15:23 December 15, 2006 | [ID of retailer 6] | $123.75 |
| [card ID 314] | 23:12 December 12, 2006 | [ID of retailer 6] | $34.58 |
| [card ID 314] | 08:43 December 15, 2006 | [ID of retailer 12] | $12.75 |

185

| CARD ID | ACCOUNT NUMBER | PIN |
| --- | --- | --- |
| [card ID 1] | 8373737780387 | 82798 |
| [card ID 2] | 5620886662888 | 82681 |
| [card ID of card 215] | 1937367750748 | 60186 |
| [card ID of card 215] | 5490311119588 | 12237 |
| [card ID of card 215] | 5308949946673 | 74728 |
| [card ID 4] | 7863580024136 | 40876 |
| [card ID n] | 7937678267975 | 29793 |

PAYMENT SYSTEM AND METHODS

RELATED APPLICATIONS

This application is a continuation-in-part of U.S. Ser. No. 12/851,079 which is a continuation of U.S. application Ser. No. 11/938,279 of JOSEPH R. RANDAZZA AND DANILO PORTAL filed 10 Nov. 2007 for PAYMENT SYSTEMS AND METHODS, the contents of which are herein incorporated by reference, which is a continuation-in-part of U.S. application Ser. No. 11/692,172 of JOSEPH R. RANDAZZA AND DANILO PORTAL filed Mar. 27, 2007 for PAYMENT SYSTEMS AND METHODS, the contents of which are herein incorporated by reference, which is a continuation-in-part of U.S. application Ser. No. 11/539,636 of JOSEPH R. RANDAZZA AND DANILO PORTAL filed Oct. 8, 2006 for PAYMENT SYSTEMS AND METHODS, the contents of which are herein incorporated by reference.

Application Ser. No. 11/692,172 claims the benefit of Provisional Application Ser. No. 60/786,830 of JOSEPH R. RANDAZZA AND DANILO PORTAL filed Mar. 29, 2006 for PAYMENT SYSTEMS AND METHODS, the contents of which are herein incorporated by reference.

Application Ser. No. 11/539,636 claims the benefit of Provisional Application Ser. No. 60/724,806 of JOSEPH R. RANDAZZA AND DANILO PORTAL filed Oct. 11, 2005 for PAYMENT SYSTEMS AND METHODS, the contents of which are herein incorporated by reference. Application Ser. No. 11/539,636 claims the benefit of Provisional Application Ser. No. 60/786,830 of JOSEPH R. RANDAZZA AND DANILO PORTAL filed Mar. 29, 2006 for PAYMENT SYSTEMS AND METHODS, the contents of which are herein incorporated by reference. Application Ser. No. 11/539,636 claims the benefit of Provisional Application Ser. No. 60/791,217 of JOSEPH R. RANDAZZA AND DANILO PORTAL Apr. 12, 2006 for PAYMENT SYSTEMS AND METHODS, the contents of which are herein incorporated by reference.

FIELD OF THE INVENTION

This invention relates generally to payment systems and methods and, more particularly, to payment systems and methods deployed in a retail environment.

BACKGROUND OF THE INVENTION

Some examples of payment systems involving a mobile phone are as follows:
US Pat. App. 2007/0233615 by Tumminaro, published Oct. 4, 2007, for "Member-supported mobile payment system";
US Pat. App. 2008/0011825 by Giordano et al., published Jan. 17, 2008, for "Transactions using handheld electronic devices based on unobtrusive provisioning of the devices";
US Pat. App. 2008/0040265 by Rackley III et al., published Feb. 14, 2008, for "Methods and systems for making a payment via a stored value card in a mobile environment";
US Pat. App. 2010/0042538 by Dheer et al., published Feb. 18, 2010, for "Money movement network method";
U.S. Pat. No. 7,689,508 issued Mar. 30, 2010 to Davis et al., for "Mobile device credit account";
U.S. Pat. No. 7,774,123 issued Aug. 10, 2010 to Pond et al., for "Electronic payment methods for a mobile device";
U.S. Pat. No. 7,784,684 issued Aug. 31, 2010 to Labrou et al., for "Wireless computer wallet for physical point of sale (POS) transactions";
U.S. Pat. No. 7,822,688 issued Oct. 26, 2010 to Labrou et al., for "Wireless wallet";
U.S. Pat. No. 7,848,980 issued to Carlson on Dec. 7, 2010, for "Mobile payment system and method using alias";
US Pat. App. 2010/0312703 by Kulpati et al., published Dec. 9, 2010, for "System and method for providing authentication for card not present transactions using mobile device";
US Pat. App. 2011/0078081 by Pirzadeh et al., published Mar. 31, 2011, for "Mobile payment application architecture";
US Pat. App. 2011/0093351 by Afana, published Apr. 21, 2011, for "Mobile payment station system and method";
U.S. Pat. No. 7,933,799 issued Apr. 26, 2011 to Aaltonen et al., for "Method and system for payment and/or issuance of credits via a mobile device".
Outside the US, a certain M-PESA system is another example. In the US, recently Google has been announcing an upcoming Google Wallet payment system.

SUMMARY OF THE INVENTION

The present inventors have recognized that what has not been addressed, before their invention, is the need for an ability for a merchant to be a direct issuer of a card-not-present debit card via a mobile device through the Federal Reserve ACH system whereby the merchant does not hold the cardholder's savings or checking account and thus "decouples" the card from the traditional bank/depository institution, especially by which a shopper can use his mobile phone in combination with his existing checking account to pay a retailer at a retail site.

According to an aspect of the present invention, there is a method for a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer. The method comprises the steps, performed at the retail site, of: receiving the first and second signals from the first card; sending the first and second signals into the routing system, to cause the second system to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system. The method further includes the step, performed at the retail site, of conditionally effecting a transaction with a holder of the first card, depending on a signal received from the second system.

According to another aspect of the present invention, there is a transaction system for operating with a system having a plurality of persons; a plurality of cards issued under authority of an entity; a retail site configured with a first signal, the first signal being common to the plurality of cards; a routing system for receiving a signal and generating a network address in response to the received signal, the routing system including a plurality of wide area communication links, the routing system being configured using the first signal, the system further including a second signal on a first card in the plurality of cards; and a second system storing an association between the second signal and account information, the entity and an owner of the second system not being affiliated, the entity not being affiliated with a retailer. The transaction system comprises means for receiving the first and second signals from the first card; means for sending the first and second signals into the routing system, to cause the second system to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system; and means for conditionally effecting a transaction with a holder of the first card, depending on a signal received from the second system.

According to yet another aspect of the present invention, there is a method for a system having a plurality of persons; a plurality of vehicles; a plurality of cards issued under authority of a government, each card evidencing a license for a person to operate a vehicle; a retail site configured with a first signal, the first signal including a license card IIN number, the first signal being common to the plurality of cards; a routing system for receiving a signal and generating a network address in response to the received signal, the routing system including a plurality of wide area communication links, the routing system being configured using the first signal, the system further including a second signal, the second signal including a personal ID number, on a first card in the plurality of cards; and a server storing an association between the second signal and account information. The method comprises the steps, performed at the retail site, of: receiving the first and second signals from the first card; sending the first and second signals into the routing system, to cause the server to perform the steps of determining whether the first card can effect payment, responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the server. The method further includes the step, performed at the retail site, of conditionally effecting a transaction with a holder of the first card, depending on a signal received from the server.

In another preferred embodiment, the invention provides a method for a system having a plurality of persons; a plurality of payment tokens issued under authority of an entity (such as, e.g., Apple; AT&T; etc.); a retail site configured with a first signal, the first signal being common to the plurality of payment tokens; a routing system for receiving a signal and generating a network address in response to the received signal, the routing system including a plurality of wide area communication links, the routing system being configured using the first signal, the system further including a second signal on a first payment token in the plurality of payment tokens; and a second system storing an association between the second signal and account information, the entity and an owner of the second system not being affiliated, the entity not being affiliated with a retailer, method comprising the steps, performed at the retail site, of: receiving the first and second signals from the first payment token; sending the first and second signals into the routing system, to cause the second system to perform the steps of determining whether the first payment token can effect payment; responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system; wherein the method further includes the step, performed at the retail site, of: conditionally effecting a transaction with a holder of the first payment token, depending on a signal received from the second system.

The invention in another preferred embodiment provides a method for a system having a plurality of persons; a plurality of payment tokens (such as, e.g., a plurality of payment tokens issued under authority of an entity (such as, e.g., an entity which is not affiliated with a retailer; an entity which is Apple; an entity which is AT&T; etc.); a plurality of payment tokens that comprises a plurality of cellular devices; a plurality of payment tokens that comprise a plurality of wireless devices; etc.); a retail site configured with a first signal, the first signal being common to the plurality of payment tokens; a routing system for receiving a signal and generating a network address in response to the received signal, the routing system including a plurality of wide area communication links, the routing system being configured using the first signal, the system further including a second signal on a first payment token in the plurality of payment tokens; and a second system storing an association between the second signal and account information, method comprising the steps, performed at the retail site, of: receiving the first and second signals from the first payment token; sending the first and second signals into the routing system, to cause the second system to perform the steps of determining whether the first payment token can effect payment; responsive to the determining step, conditionally sending a message to cause an institution to send an ACH entry to the Federal Reserve ACH system, to pass the entry to a bank, where an account is issued a debit, to cause a transfer of funds to the owner of the retail site, and making an entry in an accounting system, to effectively increment an amount owed by the owner of the retail site to the owner of the second system; wherein the method further includes the step, performed at the retail site, of: conditionally effecting a transaction with a holder of the first payment token, depending on a signal received from the second system.

The invention in another preferred embodiment provides a decoupled debit payment method for a holder of a United States checking account with a financial institution to accomplish a purchase at a retail site, wherein the checking account holder has physical possession of a payment token, the payment token not being a card with a magnetic stripe or bar code, comprising steps, performed at the retail site, of: receiving a first signal and a second signal from the payment token; sending the first signal and the second signal into a routing system; depending on a signal received from a second system in which is stored an association between the second signal and account information, conditionally effecting a transaction with the holder of the payment token; whereby the holder of the payment token has accomplished the purchase at the retail site; wherein the steps are performed by a computer or computers within an automated system.

BRIEF DESCRIPTION OF THE DRAWINGS

References are made to the following text taken in connection with the accompanying drawings, in which:

FIGS. 2A and 2B show another aspect of the first exemplary system.

FIGS. 6A, 6B, and 6C show a retail grocery store in the first exemplary system.

FIG. 9 is a representation of a table in a database in the first exemplary system.

FIG. 12 shows another data structure in an exemplary system.

FIG. 13 shows another data structure in an exemplary system.

FIG. 16 shows another data structure in an exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF PREFERRED EMBODIMENTS

In the present invention, payment token (such as payment token 1700 in FIG. 17 which shows exemplary system 17 according to a preferred embodiment of the present invention) in possession of an owner (such as shopper 1701 in FIG. 17) of a checking account at a financial institution which is an ACH member is useable by him to accomplish a purchase transaction at a retail site, without the payment token needing to be a debit or credit card issued by the financial institution. Thus, the invention provides a decoupled debit payment method.

When we refer herein to "decoupled debit" payment method, such as a payment method for a holder of a United States checking account with a financial institution, we mean that the checking account holder is able to accomplish payment using his checking account but without needing to use a card issued by his financial institution (such as a debit card issued by his financial institution).

"ACH" refers to Automated Clearing House which is a known term in the United States financial industry that refers to an existing Federal Reserve clearing house through which, for example, a check written on an account at a member financial institution is cleared.

Examples of a payment token useable in the invention include, e.g., a driver's license card or other physical card, an electronic token, a token stored in a mobile payment device, a cellular device, a smart phone, a wireless device, a handheld electronic device; a personal digital assistant; etc. Preferably the payment token is not a card with a magnetic stripe or bar code conventionally used to conduct a debit or credit card transaction by a financial institution or third party processor for financial settlement of funds due a retailer. Most preferably, the payment token is not a magnetic striped card or bar coded card.

By "a retail site", we mean a physical geographic premises at which customers are received to do business.

By someone's "physical possession" of a payment token, we mean that the payment token is on, with, or in the general immediate vicinity of someone, as opposed to being left at home while the shopper is at the retail site. The payment token is not always required to be in physical contact with the shopper.

Figure 17:
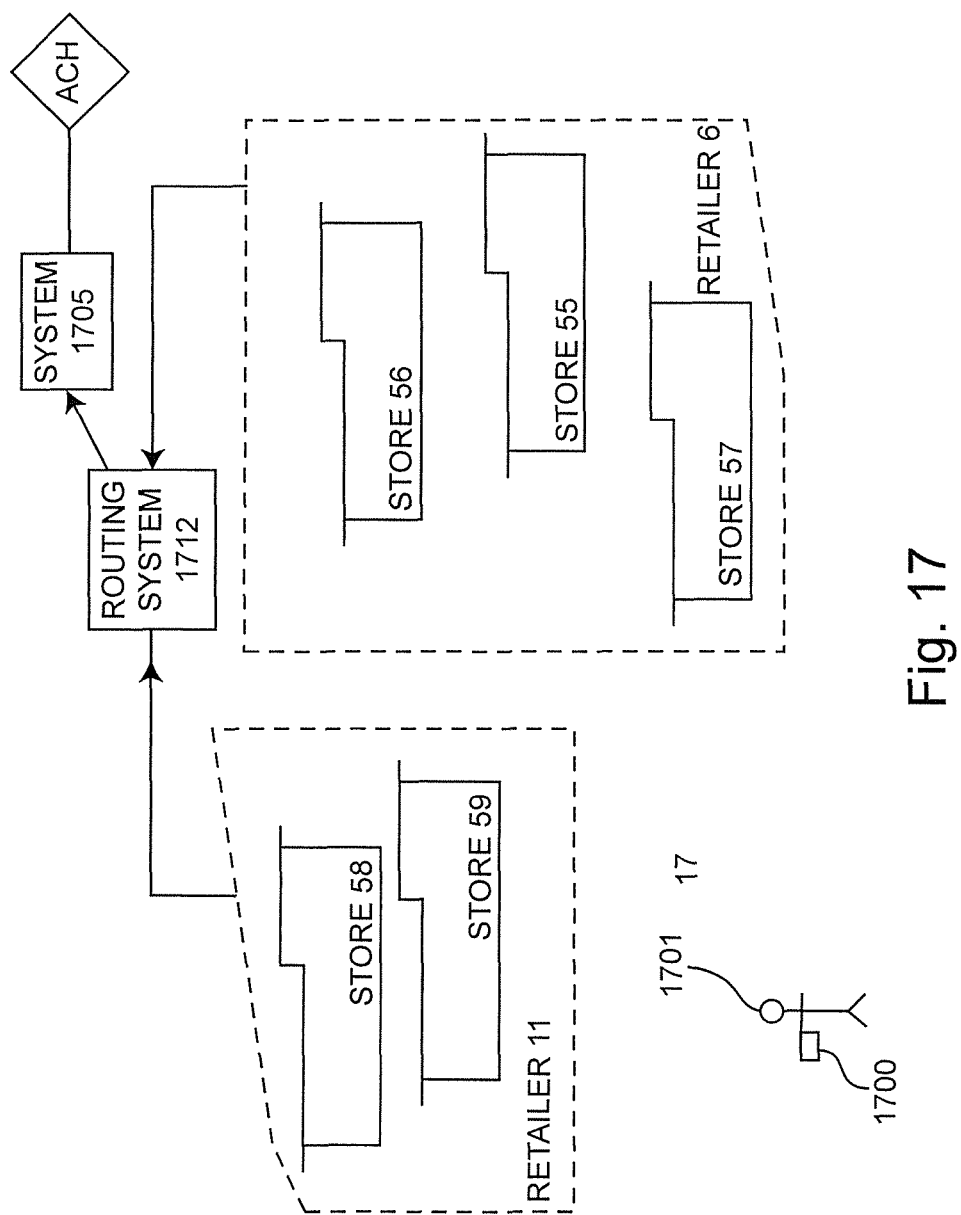
FIG. 17 shows a retail system according to an exemplary embodiment of the present invention.

In the invention, referring to FIG. 17, advantageously ACH is put to use by shopper 1701 who has a checking account, for shopper 1701 to accomplish mobile decoupled debit payment, that is, shopper 1701 accomplishes payment based on his checking account but otherwise than in conventional ways of writing a paper check, swiping a magnetic-striped debit card, or using a bar-coded card which, before the invention, shopper 1701 would have needed to carry with him in order to use his checking account to make a purchase at a retail site. Payment token 1700 is used or presented by shopper 1701 to put into motion electronic processes by which communication with ACH is accomplished. Most preferably, payment token 1700 is such that shopper 1701 is not required to carry another physical item in addition to what he already carries by necessity and choice. In an example of a shopper 1701 who is a licensed driver, he would already be carrying a driver's license in his wallet as a matter of course and a payment token 1700 that is his driver's license does not add an additional physical item for him to carry. As another example, in a case of a shopper 1701 who carries a mobile phone, a payment token 1700 that is the mobile phone, or a part thereof, does not add an additional physical item for shopper 1701 to carry.

In system 17, automated system 1705 (such as, e.g., system 5 in FIG. 1) is in communication with ACH and is able to receive communications routed via routing system 1712 (such as, e.g., routing system 120 in FIG. 1) from retailers (such as retailer 6 and retailer 11 in FIG. 1) An example of system 1705 is, e.g., a privately-owned system. In most embodiments, system 1705 and routing system 1712 are in different geographical places. In most embodiments, system 1705 would be elsewhere than at a retail site or other premises of a retailer. In most embodiments, routing system 1712 would be elsewhere than at a retail site or at a premises of a retailer. Preferably routing system 1712, in addition to receiving and routing communications as appropriate to system 1705 which then communicates with ACH, also receives and routes communications elsewhere as appropriate such as to a credit card system (such as credit card system 4 in FIG. 1) and a debit card system (such as debit card system 7 in FIG. 1). For system 1705, conventional hardware may be used. For routing system 1712, conventional hardware may be used.

For practicing the invention, a retail site (such as stores 55, 56, 57, 58, 59 in FIG. 1) is provided with equipment (not shown in FIG. 17) that communicates with payment token 1700 when shopper 1701 wants to shop using payment token 1701. When shopper 1701 uses a payment token 1700 according to the invention to accomplish a mobile payment making use of ACH, the amount of time needed from when the shopper 1701 uses or otherwise presents the payment token 1701 until ACH has processed the communications and sent back communications that result in mobile payment having been accomplished is in real-time, such as, e.g., a matter of seconds.

The equipment installed at the retail site is chosen to coordinate with payment token 1700. For example, if the retail site intends for a shopper 1701 to be able to use a payment token 1700 that is a driver's license, equipment that recognizes and processes a driver's license is installed at the retail site. As another example, if the retail site intends for a shopper 1701 to be able to use a payment token 1700 that is a mobile phone or part thereof, equipment that recognizes and processes a signal or signals from a mobile phone, or part thereof, is installed at the retail site.

In order for payment token 1700 to be recognized when used at a retail site to make payment using shopper 1701's checking account, shopper 1701 enrolls by completing a one-time, pre-shopping enrollment process, preparatory to his shopping successfully with his payment token 1700. Through the enrollment process, the payment token 1700 is thereby entered into the data maintained by the business owning or operating routing system 1712 and/or system 1705.

How the payment token 1700 is physically used to initiate the automated steps by which mobile payment is accomplished is not particularly limited, with examples being, e.g., inserting the payment token 1700 into optical scanner equipment at the retail site; swiping the payment token 1700 in a vicinity of equipment at the retail site; using the payment token 1700 to dial a number posted at the retail site; etc.

EXAMPLE 1

Figure 1:
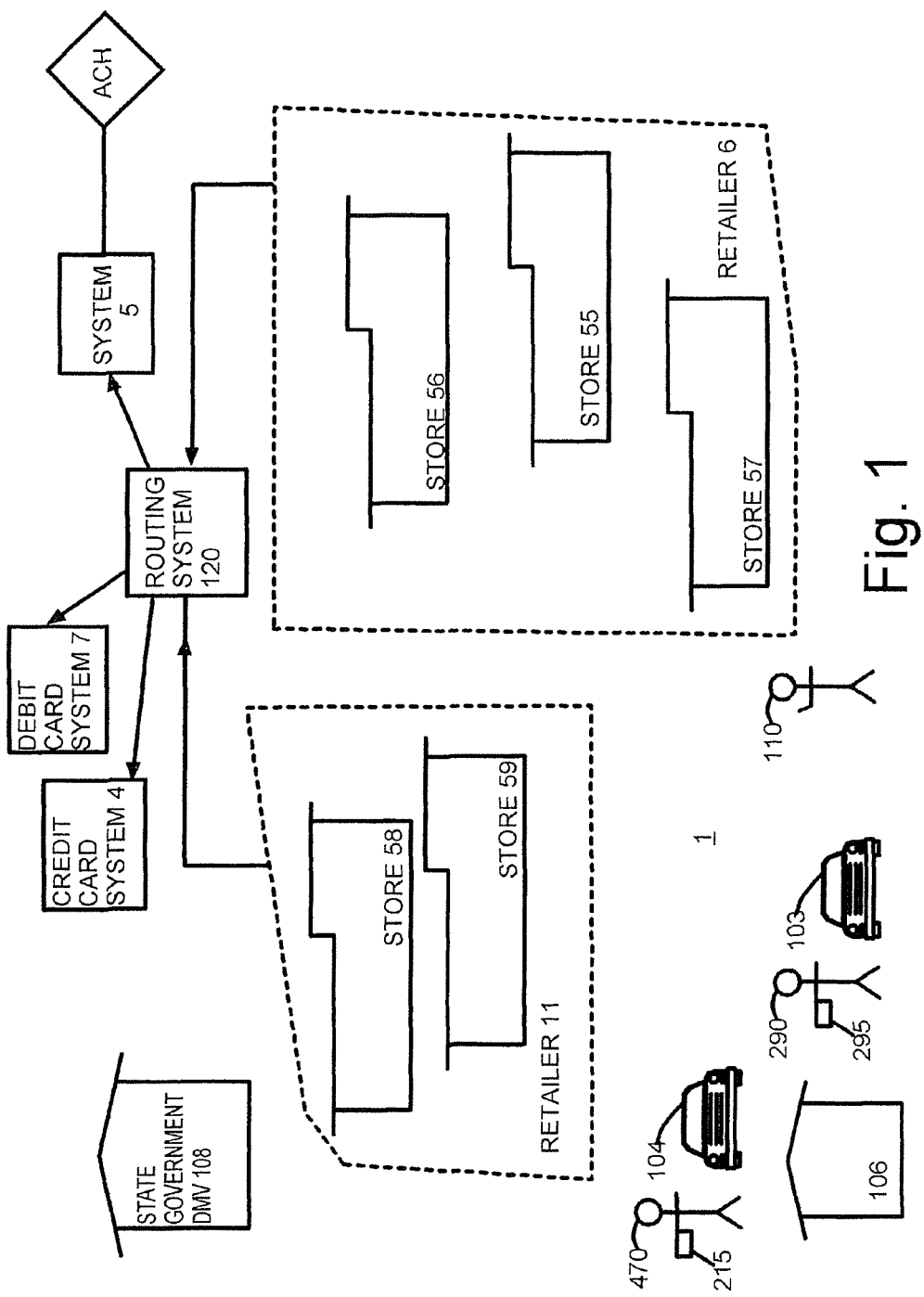
FIG. 1 shows a retail system according to a first exemplary embodiment of the present invention.

As one non-limiting example of FIG. 17, FIG. 1 shows exemplary system 1 according to a preferred embodiment of the present invention. System 1 includes multiple persons, such as person 290 and person 470. System 1 also includes a plurality of vehicles, such as automobile 103 owned by person 290 and automobile 104 owned by person 470. Person 290 operates automobile 103 to travel from her home 106 to various locations, such as her place of employment, and store 55 in retailer 6. Person 290 carries a driver's license card 295 evidencing a license to operate a vehicle such as automobile 103. Person 470 operates automobile 104 to travel from her home to various locations, such as store 55 in retailer 6. Person 470 carries a driver's license card 215 evidencing a license to operate a vehicle such as automobile 104.

These licenses and license cards 215 and 295 license were issued under the authority of a government agency, such as the Florida Department of Motor Vehicles (DMV) by Motor Vehicle Department 108, which is a part of the Florida State Government. Occasionally, persons 290 and 470 must display their driver's license cards to state officials, such as policeman 110 to prove they are authorized to operate an automobile.

Figure 2B:
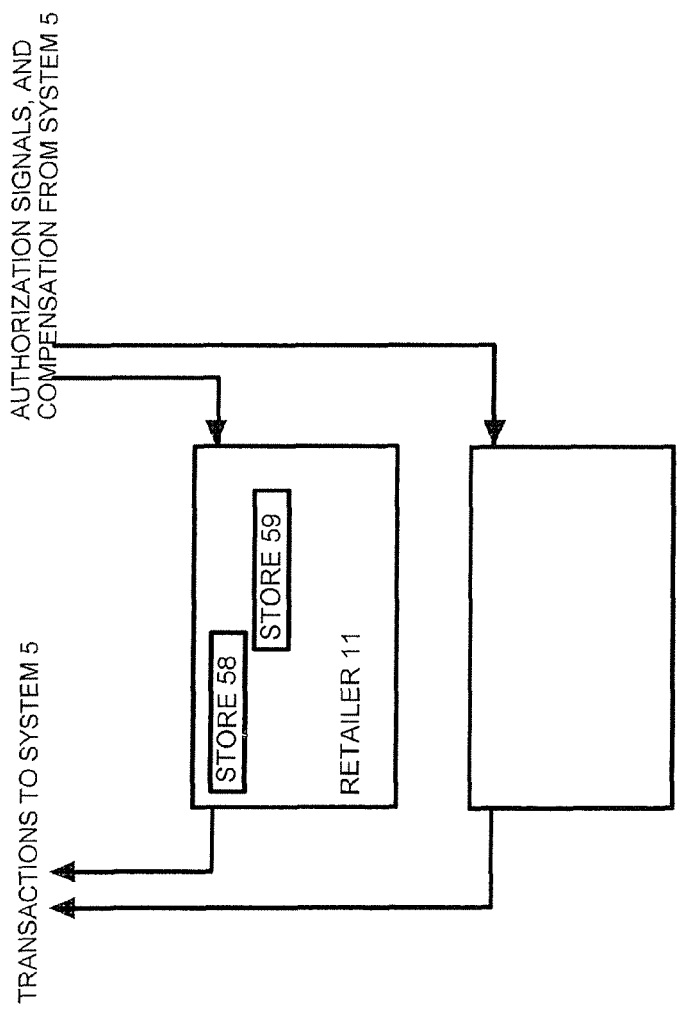

FIGS. 2A and 2B emphasize other aspects of System 1. System 1 includes system 5, which communicates with retailers 6, 10, and 11, via routing system 120. Services from payment processors—such as First Data, RBSlynk, and Fifth Third—may be configured to implement routing system 120.

System 5, in a location such as Reston, Va., receives signals from the retailers, to validate customer authorization at the time of a retail transaction, and to debit a customer account later. A signal from a retailer to system 5 is represented by a directed line going from the retailer to system 5; and a signal from system 5 to a retailer is represented by a directed line going from system 5 to the retailer.

In response to a signal from system 5, retailer 6, for example, allows a customer transaction to proceed.

System 5 is owned and operated by a private entity that is under the general control of neither the Florida State Government nor the Virginia State Government. Of course the private entity that owns and controls system 5 may have certain statutory, regulatory, contractual, or common law obligations to these state governments, as any persons resident in a state would have.

The owner of system 5 and the owner of retailer 11 are non-affiliated, meaning that they are not affiliates with respect to each other. Is this patent application, concerns are affiliates of each other when one concern controls or has the power to control the other, or a third party or parties controls or has the power to control both. Power to control is described in Section 121 of the U.S. regulations of the Small Business Administration.

The owner of system 5 and the owner of retailer 6 are non-affiliated.

The owner of system 5 and the owner of retailer 10 are non-affiliated.

Figure 3A:
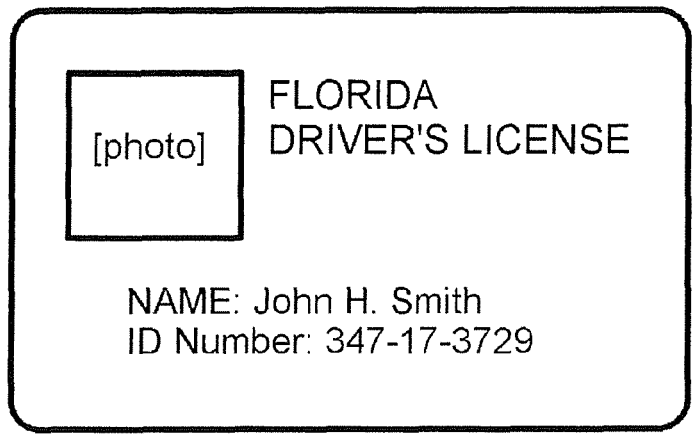
FIGS. 3A and 3B show a driver's license card, which is an example of a payment token, in the first exemplary system.
Figure 3B:
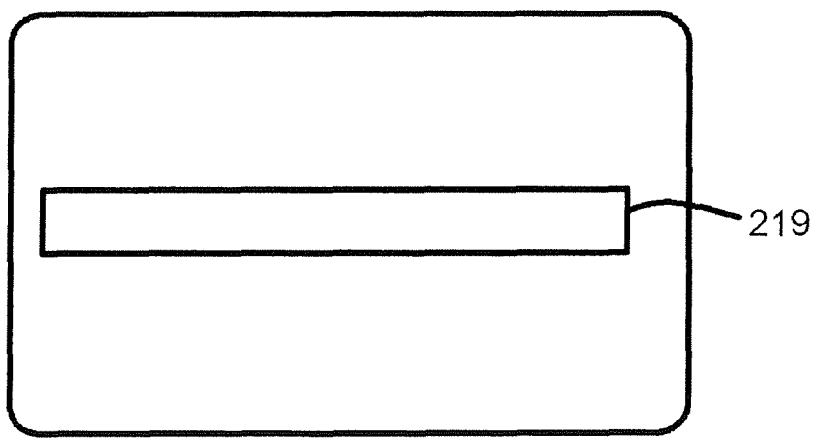

FIG. 3A shows a front, plan view of card 215 carried by person 470, who is a customer in system 1, and FIG. 3B shows a back, plan view of card 215. In this example, card 215 is a state-issued driver's license including a photograph 217 of person 470, and magnetic stripe 219 storing the ID number and other information on the reverse side. Track 2 of stripe 219 also stores the number 636010, indicating the jurisdiction of Florida, in accordance with International Standard ISO 7812.

Figure 4A:
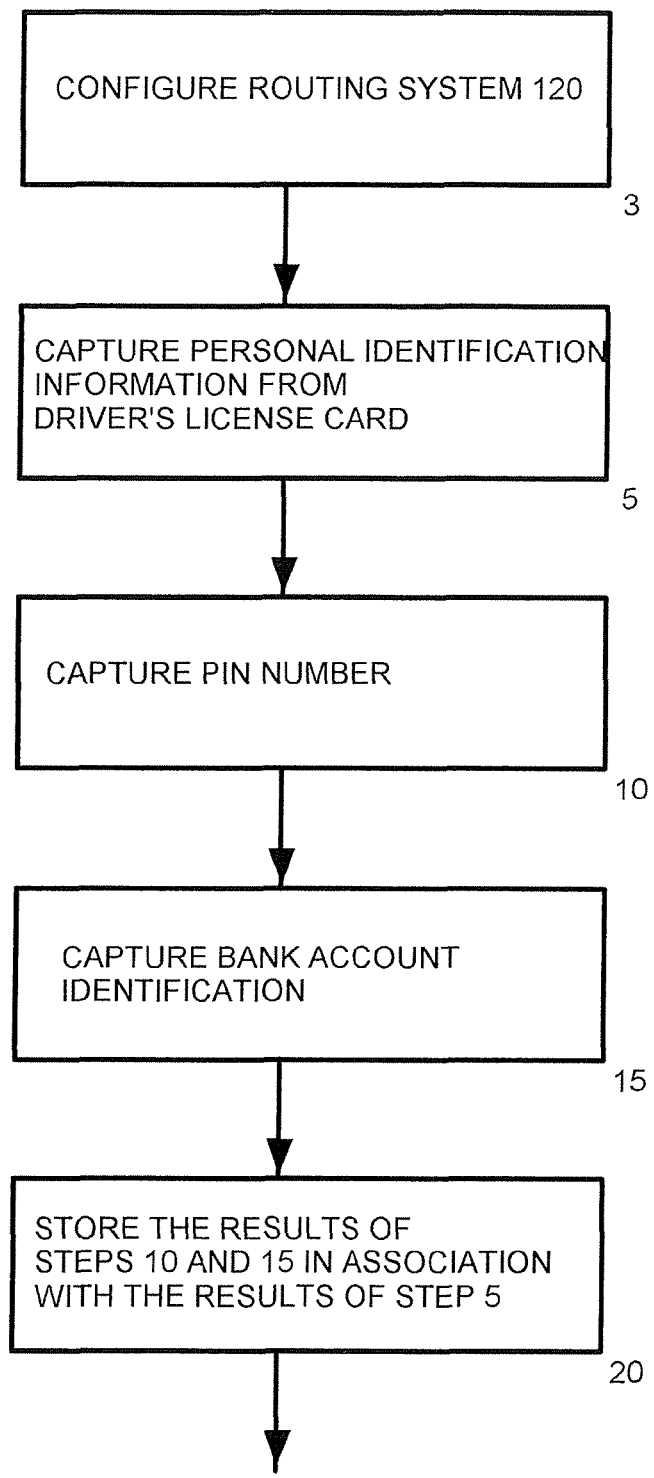
FIGS. 4A, 4B, and 4C are a flowchart of a process performed in the first exemplary system.
Figure 4B:
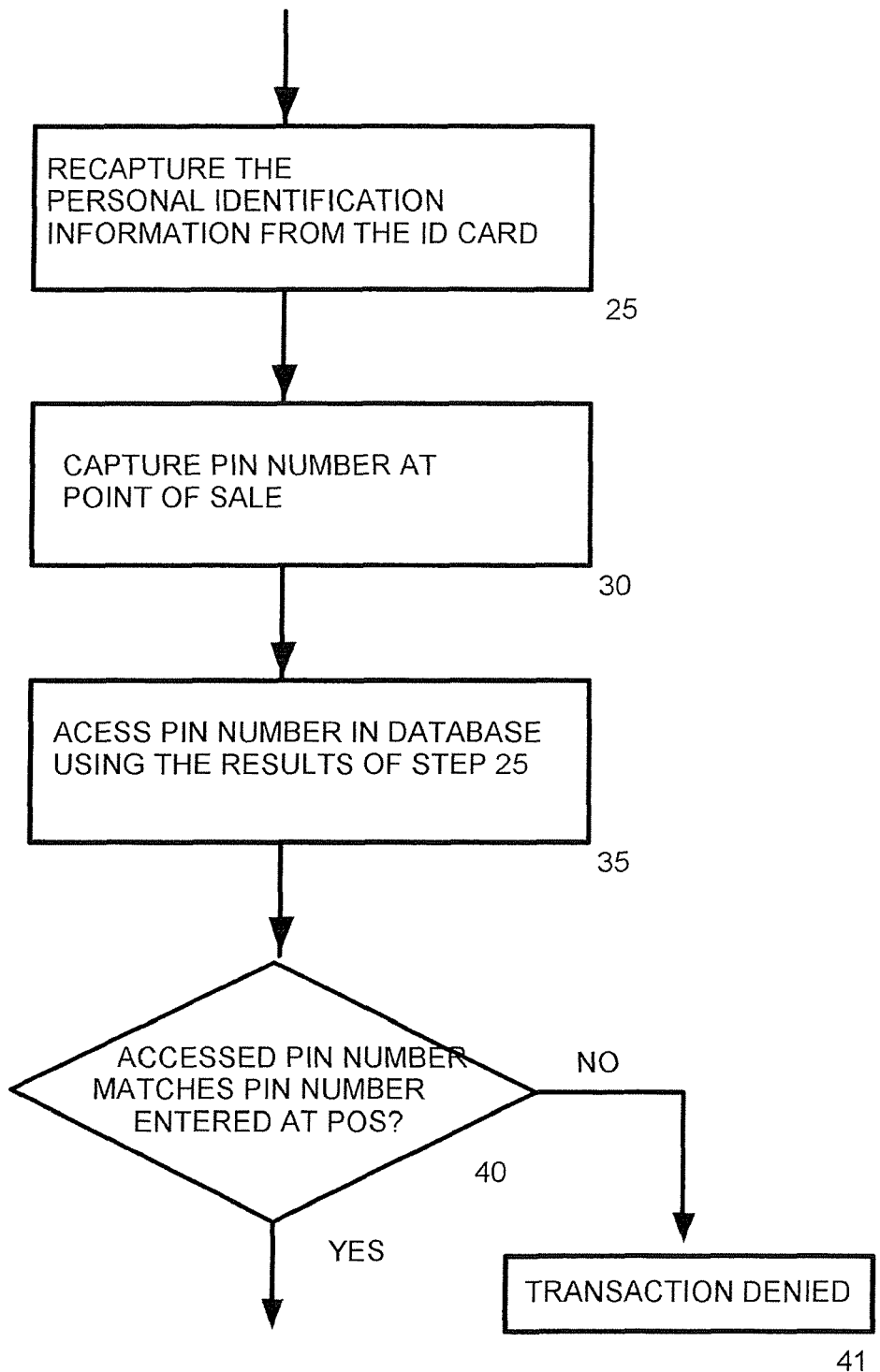
Figure 4C:
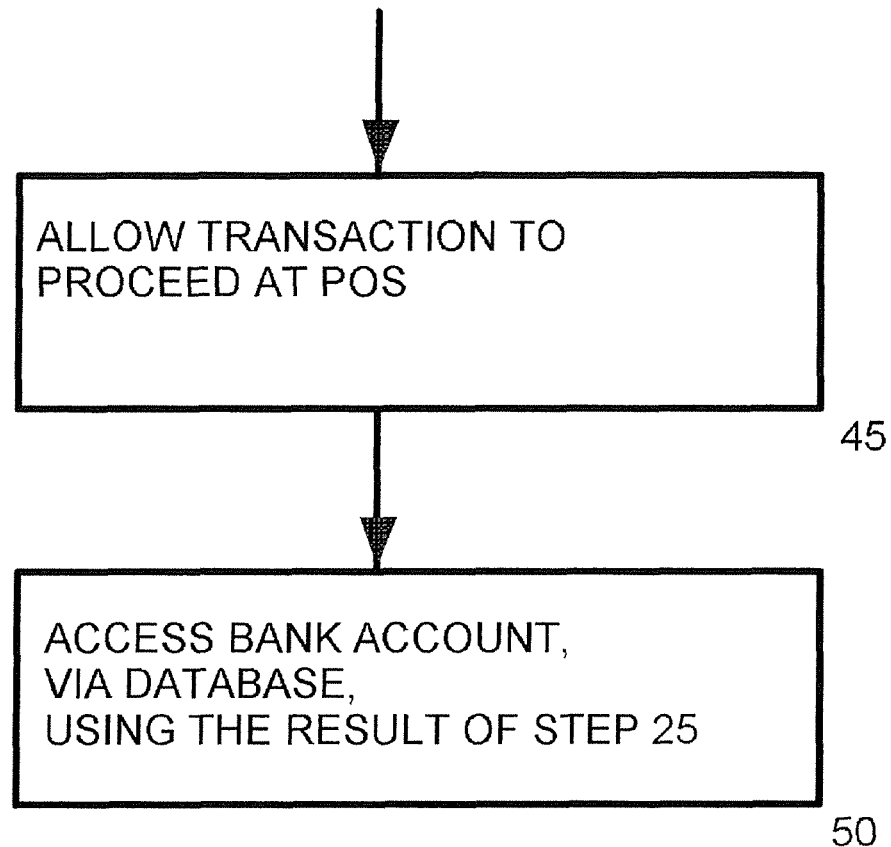

FIGS. 4A, 4B, and 4C show a process performed by circuitry in system 1. Step 3 includes configuring routing system 120, in accordance with a network address, or network position, of system 5, so that certain signals will be sent to system 5, as described in more detail below.

Steps 5, 10, and 15 are performed for multiple persons, in a store of a retailer, such as retailers 6, 10, and 11. In order to enroll in the program, the customer enters a card number and bank account number at a web site. Alternately, the customer is processed at the retailer customer service area, where the magnetic stripe 219 of card 215 is scanned (step 5), a personal identification number (PIN) entry is received from the consumer into the terminal (step 10), and a personal check is scanned (step 15). The collection of the card identification number, PIN, the bank routing and account number read from the check, then becomes part of transmitted packet to system 5, in which they are stored in association in a database (step 20). The method and protocol for this transmission is TCP/IP.

Figure 6B:
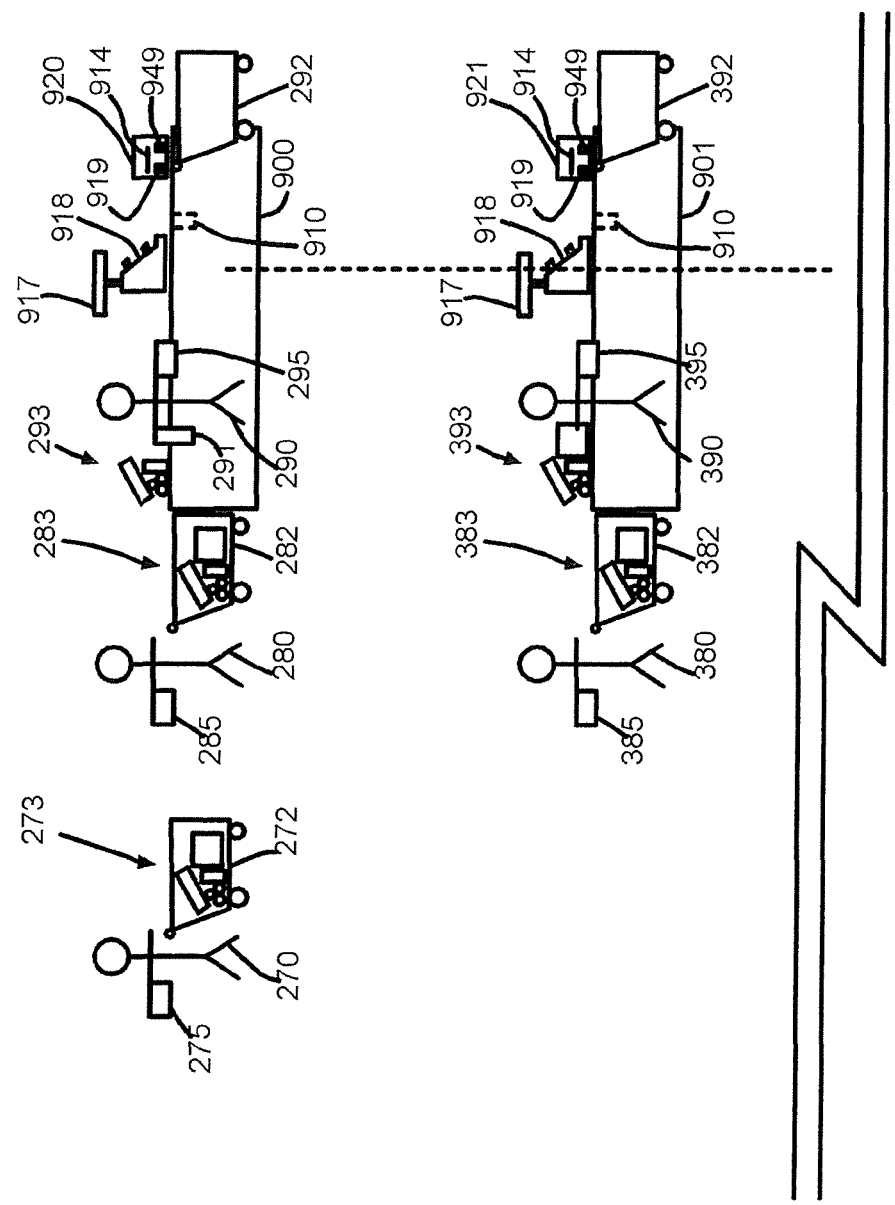
Figure 6C:
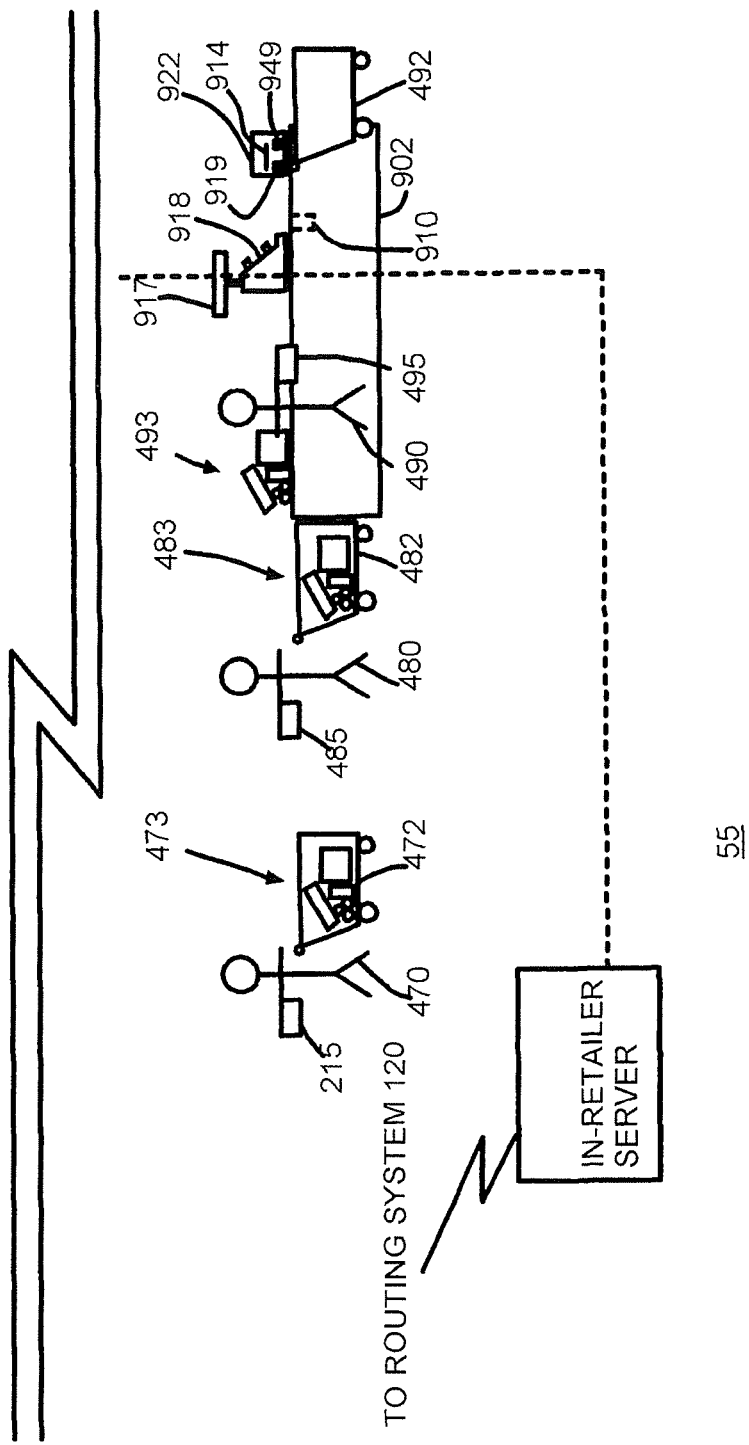

FIGS. 6A, 6B, and 6C show a context in which subsequent steps of the flow chart of FIGS. 4A, 4B, and 4C are performed. FIGS. 6A, 6B, and 6C are each a partial view of store 55 in retailer 6. Store 55 has a plurality of product areas, each corresponding to a respective product, and checkout stations 900, 901, and 902. Each checkout station includes a bar code reader that detects an optical (electromagnetic) signal reflected from a bar code, and a magnetic stripe reader that scans a magnetic card. Checkout station 900 includes payment terminal 920 having a card interface slot 914, checkout station 901 includes payment terminal 921 having a card interface slot 914, and checkout station 902 includes payment terminal 922 having a card interface slot 914. Each payment terminal includes a button 919 labeled "CREDIT" and a button 949 labeled "DEBIT". Each of these buttons is one kind of user interface object.

Upon completion of shopping, each customer brings selected products from the shelves to checkout station 900, 901, or 902.

Each customer presents her customer card. In this example, customer 490 presents credit card 495, which is associated with an installment payment account of customer 490. Customer 480 presents debit card 485, which is associated with a demand bank account of customer 480. Customer 470 presents system-5-registered driver's license card 215.

Customer 490 completes the purchase of her selected products 493 by transferring products 493 from her cart 492 to station 902, and by presenting card 495. A checkout clerk (not shown) scans each selected product past bar code reader 910, or enters the product selection information manually via keyboard 918. Checkout station 902 determines a total amount due and prints the total amount due on display 917. Customer 490 activates credit button 919. In response to the activation of credit button 919, circuitry in the retailer transmits the account number of card 495 to a credit/debit card authorization provider, such as credit card system 4 shown in FIG. 7, via routing system 120.

In this patent application, the word circuitry encompasses dedicated hardware, and/or programmable hardware, such as a CPU or reconfigurable logic array, in combination with programming data, such as sequentially fetched CPU instructions or programming data for a reconfigurable array.

Customer 480 completes the purchase of her selected products 483 by transferring products 483 from her cart 482 to station 902, and by presenting card 485. The checkout clerk scans selected products past bar code reader 910. Checkout station 902 determines a total amount due and prints the total amount due on display 917. Customer 480 activates debit button 949. In response to the activation of debit button 949, circuitry in payment terminal 922 prompts customer 480 to enter a PIN number into a keypad on terminal 922. Terminal 922 then applies an encryption key to the entered PIN number, to generate an encrypted PIN. Circuitry in the retailer then transmits the encrypted PIN and the account number of card 485 to a credit/debit card authorization provider, such as debit card system 7 shown in FIG. 7, via routing system 120. Debit card system 7 could be operated by the Master Card Corporation.

Customer 470 completes the purchase of her selected products 473 by transferring products 473 from her cart 472 to station 902, and by presenting driver's license card 215. The checkout clerk scans selected products past bar code reader 910. Checkout station 902 determines a total amount due and prints the total amount due on display 917. Station 902 reads the ID information of person 470 from card 215, and reads the Issuer Identification Number, 636010, indicating the State of Florida, from driver's license card 215. (step 25) (FIG. 4B). Customer 470 or the clerk activates debit button 949. In response to the activation of debit button 949, circuitry in payment terminal 922 prompts customer 470 to enter a PIN number into a keypad on terminal 922. Terminal 922 then applies an encryption key to the entered PIN number, to generate an encrypted PIN number. Circuitry in the retailer then transmits the encrypted PIN and the licensee identification of driver's license card 215 to system 5, via routing system 120. At this time the server also transmits retailer ID, store ID date, time, lane ID, cashier ID, transaction amount.

Alternatively, station 902 may be configured so that customer 470 need not activate the credit button 919. In this alternative, station 902 detects the IIN of the card and conditionality applies an encryption key to the entered PIN depending on the detected IIN. In other words, in this example, station 902 word detects the IIN of card 215 and sends the entered PIN without applying the encryption key to the entered PIN.

Circuitry in system 5 uses the ID number of the card, transmitted by the server, to access the associated PIN stored in the database. (step 35). System 5 thus compares the PIN, transmitted by the store server, to the PIN read from the database. (step 40). Depending upon the result of step 40, system 5 conditionally responds to the store server with a card-authorized signal, causing station 902 to allow customer 470 to carry away products 473. (step 45).

Otherwise system 5 sends a card-not-authorized signal to the store server.

Step 40 may also include real-time communication to an external database to validate the card against a negative check database.

It is presently preferred that system 5 validate incoming transactions and respond back to the store within several seconds.

Figure 5:
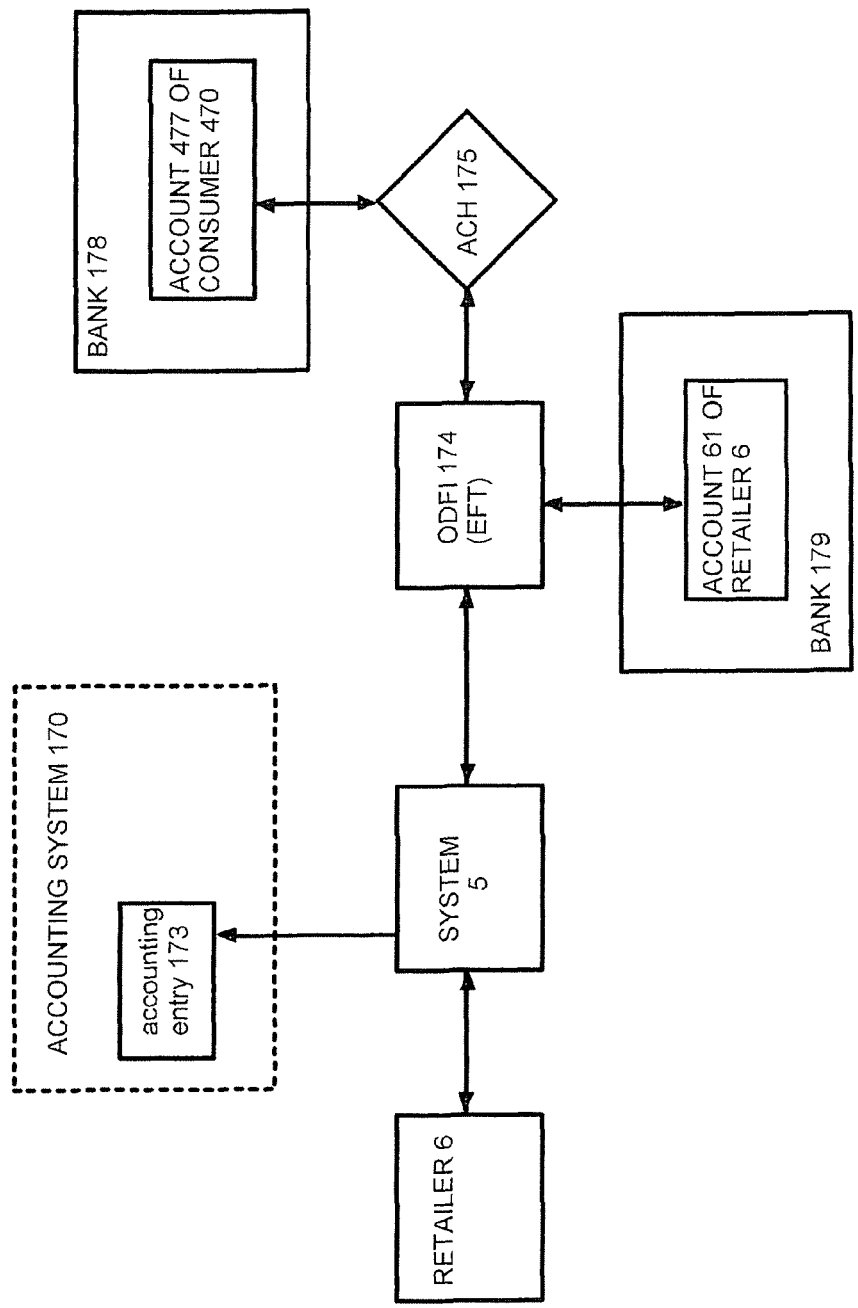
FIG. 5 shows another aspect of the exemplary system.

FIG. 5 is a diagram emphasizing other aspects of the exemplary system.

ODFI (Originating Depository Financial Institution) 174 originates an ACH (Automated Clearing House) entry at the request of system 5. ODFI 174 sends the entry to the Federal Reserve ACH system 175, which passes the entry to bank 178, which acts as a Receiving Depository Financial Institution (RDFI), where account 477 is issued debit, provided there are sufficient funds. Thus ODFI 174 effects an Electronic Funds Transfer (EFT).

When system 5 settles a transaction by causing the transfer of funds from account 477 of consumer 470 to account 61 of retailer 6, system 5 makes an entry in accounting system 170, to effectively increment an amount 173 owed by the retailer 6 to the owner of system 5. This amount is a fee for settling the transaction.

Figure 8:
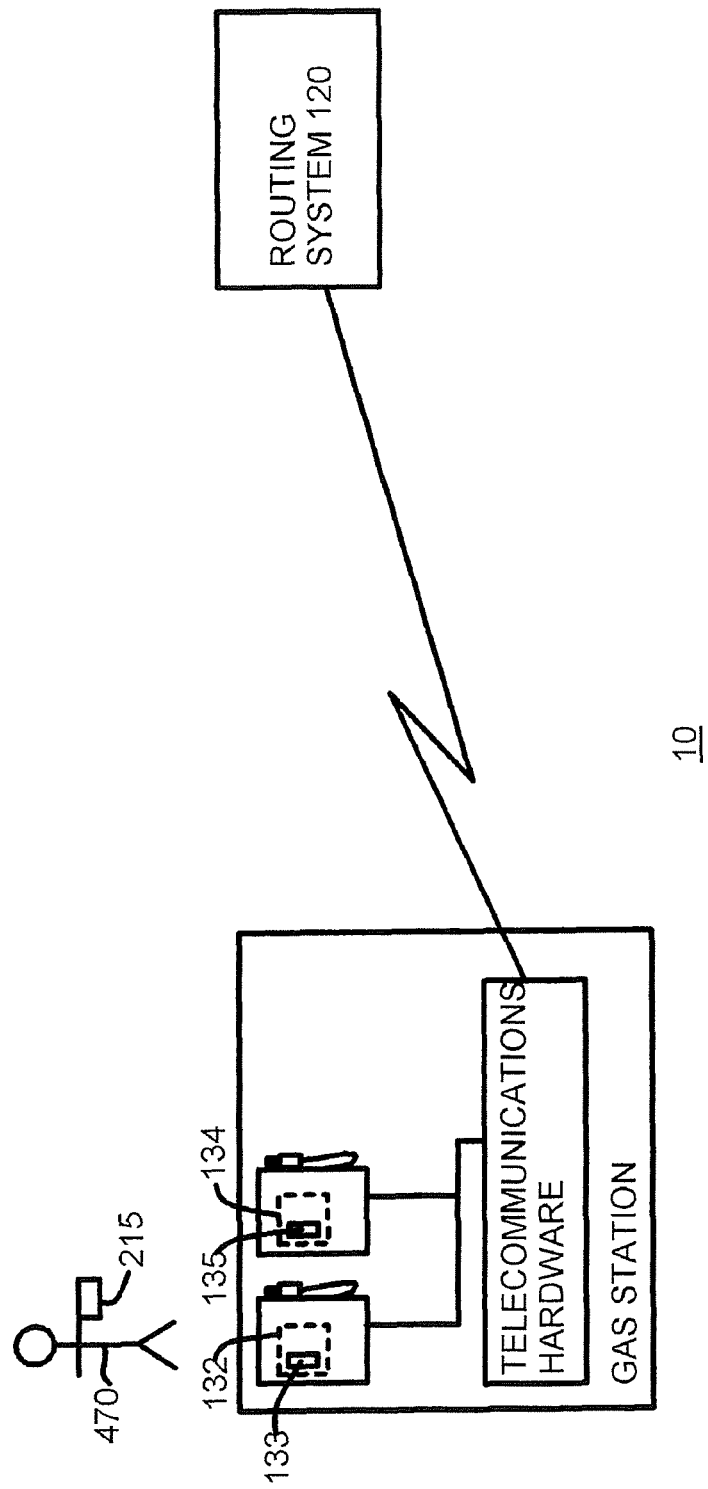
FIG. 8 shows another retail site in the first exemplary system.

FIG. 8 shows retailer 10 in system 1 in more detail. Retailer 10 includes a gas station. Computer system 131 is in the gas station. The gas station includes gas pump point of scale (POS) terminal 132 with card interface 133, gas pump POS terminal 134 with card interface 135, telecommunications circuitry, and a network cable coupling POS terminal 132, POS terminal 134 and telecommunications circuitry together.

Customer 470 buys gas by presenting card 215, either at the payment terminal 132 or elsewhere in the gas station. The gas station reads the ID information from card 215.

Circuitry in system 5 uses the ID number of the card, transmitted by circuitry in retailer 10, to access the associated PIN stored in the database. System 5 conditionally responds to the server in retailer 10 with a card-authorized signal, or a card-not-authorized signal. If the server receives a card-authorized signal, the transaction proceeds and the server then transmits a transaction amount to system 5.

Automated Clearing House (ACH) Settlement transmission occurs daily in batch fashion. (step 50). More specifically, system 5 compiles a file at end of day for submission to the ACH services. The required fields that this file contain are: date, time, transaction type, retailer ID, store ID, bank routing #, bank account #, amount of transaction. The specifics and file format is further defined with the ACH processor.

Status from ACH is collected and logged for review.

Figure 7:
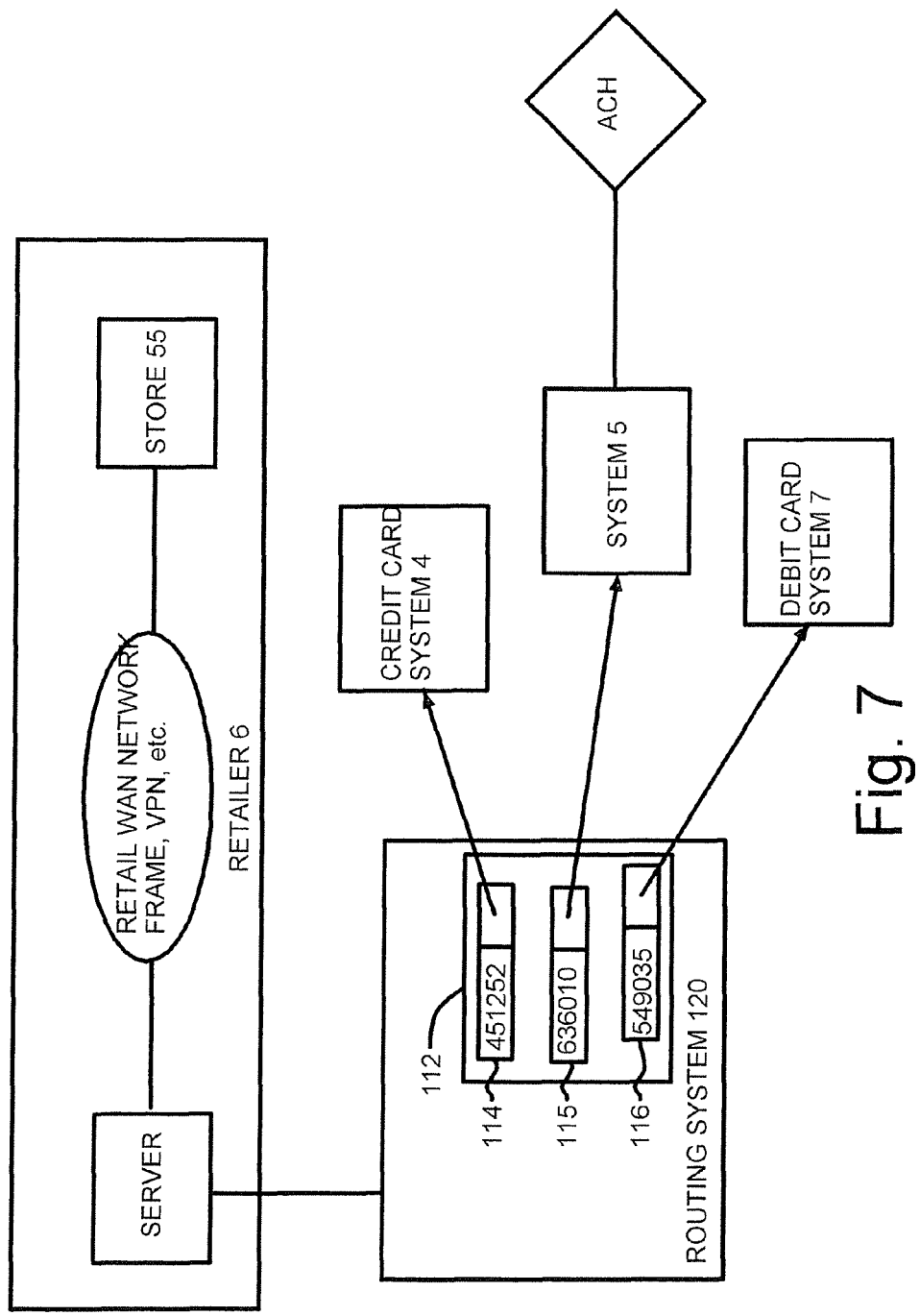
FIG. 7 is a diagram showing transaction flows in the first exemplary system.

FIG. 7 shows another aspect of the first exemplary system, including an in-retailer server that is the gateway of communication leading to routing system 120. Routing system 120 includes a data structure 112, accessed by programs in routing system 120. Data structure 112 allows routing system 120 to select the path of a transaction request packet received from a retailer, as a function of a routing field in the packet. The routing field may contain an issuer identification number (IIN). For example, when routing system 120 receives a transaction request packet containing the number 451252 in the routing field, routing system 120 accesses entry 114, to send the packet to credit card system 4, allowing system 4 to authorize a credit card transaction. Credit card system 4 could be operated by the VISA Corporation.

When routing system 120 receives a transaction request packet containing the number 636010 in the routing field, routing system 120 accesses entry 115, to send the packet to system 5. When routing system 120 receives a transaction request packet containing the number 549035 in the routing field, routing system 120 accesses entry 116, to send the packet to debit card system 7, allowing system 7 to authorize a debit card transaction.

FIG. 9 is a representation of a table 7 in a disk-resident database in system 5. Each row in table 7 is an association between a card ID and other data such as an account number associated with the card ID, and a PIN number associated with the account.

The application will have user interface to activate/inactivate/delete and reissue a card. Transaction logging contains detail information for each payment transaction. For example, the detail includes time stamp: store ID: lane ID: cashier ID: card #: payment amount: swiped vs. bar-coded.

In summary, a point-of-sale payment transaction is effected via a State issued motor vehicle driver's license card and a personal identification number (PIN) as a mechanism of payment for a retail store transaction. A State issued motor vehicle driver's license is processed to identify a consumer and initiate payment at the Point of Sale, without the use of any other form of payment.

The POS allows the driver's license to be used as a form of payment to debit a consumer checking account or savings account as a electronic fund transfer using the Federal Reserve Automatic Clearing House (ACH) for settlement.

The system utilizes the driver's license card; a PIN number or Biometric Signature for authentication; POS/payment terminal equipment; a communications network to link to retailers POS system to a ACH host processor; a data base with registered consumers banking information; the ACH system for settlement. The system can be used at any retail facility that installs the system. These include supermarkets, convenience stores, gas stations, general merchants, restaurants etc.

The system allows the consumer to be enrolled into this system either at a merchant location via an operated by store personnel enrollment software program, a self-service kiosk or via the web.

The consumer enrollment process captures information identifying the consumer, to form an electronic record that is stored in a remote or local computer. Once the enrollment is complete, the consumer can use the driver's license to pay for goods and services at any merchant point of sale location using the process and technology of this system.

System 1 provides a process mechanism (Enrollment) for linking, the consumer driver's license card, based on national standard, magnetic and 2d format to be scanned or swipe, capturing the content of the magnetic data or the decoded barcode data, using a parsing algorithm that presents the data necessary to build the electronic record required by this system. This includes the driver's license number, date of birth, age, address, state issued, date driver's license is issued, date driver's license expires, gender.

Once the driver's license card information is captured, the consumer is asked to enter a PIN. The PIN is encrypted and made part of the electronic record. Next the consumer is asked to present a blank commercial bank check, this check is scanned by check reader that will capture the image of the check, the bank routing number and the bank account. Once the above process is completed the electronic record is formed and stored in a local or remote computer depending on the merchant network infrastructure.

EXAMPLE 2

Figure 10:
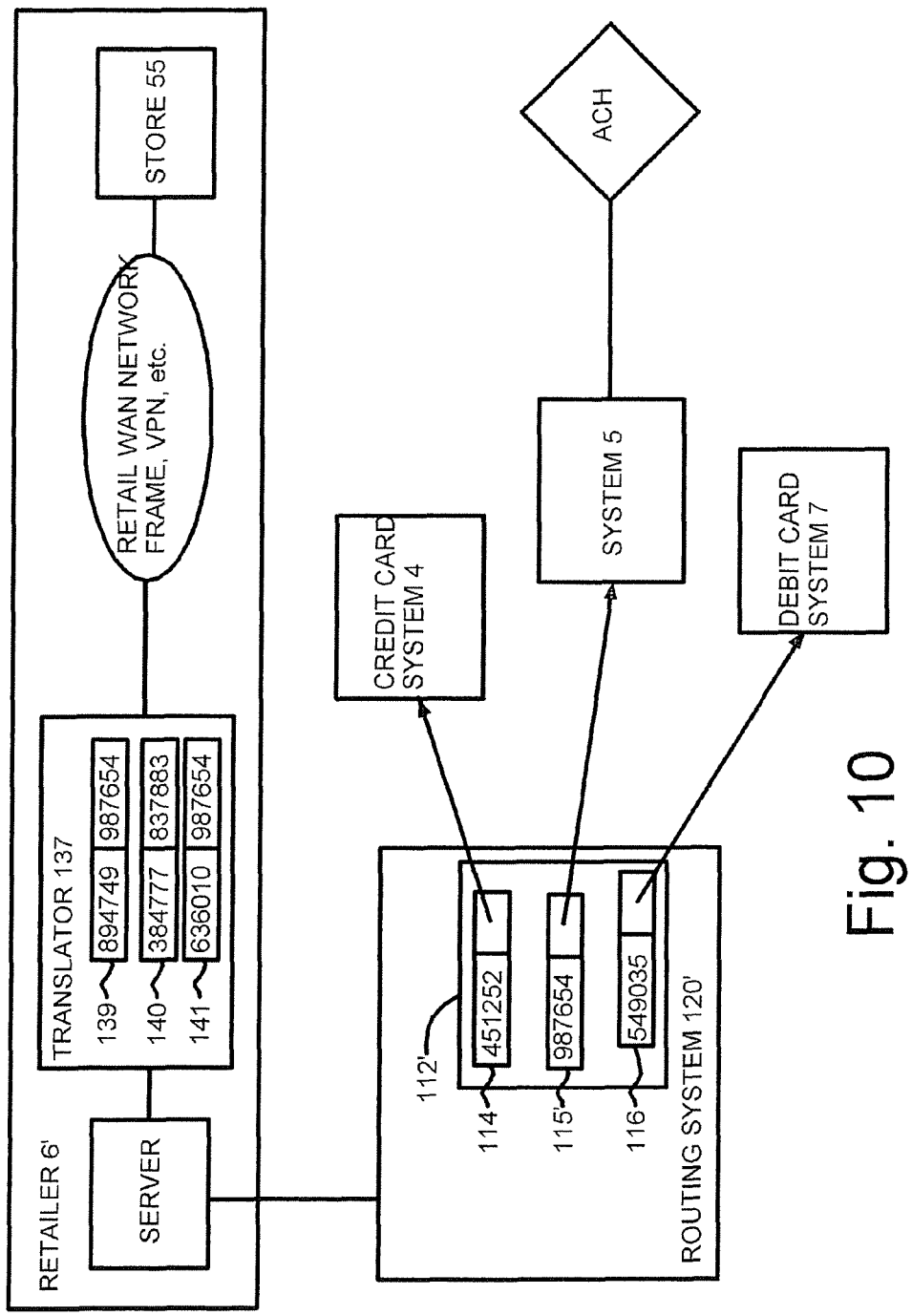
FIG. 10 is a diagram showing transaction flows in the second exemplary system.

FIG. 10 shows exemplary system 1' according to a second preferred embodiment of the present invention. System 1' includes routing system 120' circuitry in retailer 6' that is the gateway of communication leading to routing system 120'. Translator circuitry 137 detects certain Issuer Identification Numbers from cards used by consumers in retailer 6' and, responsive to such detection, translates to or substitutes a different number. For example, each of entries 139, 140, 141 contains an IIN to be detected on the left half of the entry, and contains a corresponding number to be substituted on the right half of the entry. Software executing in translator 137 examines the left half of the entries. Thus, when a POS in retailer 6' reads a number driver's license card 636010, indicating the jurisdiction of Florida, translator 137 substitutes the 636010 with 987654.

Routing system 120' includes a data structure 112', accessed by programs in routing system 120. Data structure 112' allows routing system 120' to select the path of a transaction request packet received from a retailer, as a function of a routing field in the packet. The routing field may contain an issuer identification number (IIN). For example, when routing system 120' receives a transaction request packet containing the number 451252 in the routing field, routing system 120' accesses entry 114, to send the packet to credit card system 4, allowing system 4 to authorize a credit card transaction. When routing system 120 receives a transaction request packet containing the number 987654 in the routing field, routing system 120' accesses entry 115', to send the packet to system 5. When routing system 120' receives a transaction request packet containing the number 549035 in the routing field, routing system 120' accesses entry 116, to send the packet to system 7, allowing system 7 to authorize a debit card transaction.

Throughout this patent application, certain processing may be depicted in serial, parallel, multiplexed, or other fashion, for ease of description. Actual hardware and software realizations, however, may be varied depending on desired optimizations apparent to one of ordinary skill in the art.

EXAMPLE 3

System 5", according to a third exemplary system can establish various method of communication with the financial processor, including 1) frame relay connection to the financial processor to support the ISO 8583 host to host communication interface as per the specs outlines in this document; 2) an SSL session via the internet that supports the ISO 8583 format; and an https communication via the internet. This method provides a faster implementation, which avoids the set-up of a network infrastructure.

In order to enroll in the program, a consumer is prompted for a driver's license number, a PIN entry, a bank routing, and a demand bank account number, which then becomes part of transmitted packet via a secure SSL connection to System 5".

The transaction at the POS is effected using some of the circuitry used to effect a debit card transaction. The transaction is tendered as debit payment, the driver's license is swiped at the payment terminal and a prompt for PIN is generated. The pin is encrypted with the current processor PIN algorithm and flows from the store to the Financial Processor encrypted in similar fashion as for bank debit cards.

Pin encryption will follow the current standard use by the payment processor used by the retailers. Once the transaction signal reaches the processor, the processor will decrypt the pin and re-encrypt using a System 5" key. The transaction is then sent to System 5" for processing.

Message Header

Regardless of message format all incoming and outgoing message to System 5" switch should have the following message format.

TABLE 1

| Field Name | Length | Description |
|---|---|---|
| ID | 2 | Value should always be "NP" |
| Length | 4 | Length of message not including header length in network format |

ISO 8583 Format

Introduction

ISO 8583 specifies a common interface by which financial transaction may be interchanged between financial systems. It specifies messages structure, format and content, data elements and value of data element.

Message Structure

Each message identified in the ISO is constructed in the following sequence: message header, message type identifier, one or more bitmaps and a series of data elements in order of the bitmap representation.

1. Message Type Identifier

A four digit numeric field describing each message class and function. Every message shall start with a message identifier. Only the message identifier related to this design will be described in this document. Refer to ISO 8583 document for a complete list of all identifiers.

TABLE 2

| Message Type | Description | Originating System |
|---|---|---|
| 0200 | Authorization Request | Acquirer |
| 0210 | Authorization Response | Card Issuer |
| 0100 | Pre-Authorization Request | Acquirer |
| 0110 | Pre-Authorization Response | Card Issuer |
| 0220 | Completion Request | Acquirer |
| 0230 | Completion Response | Card Issuer |

2. Bitmaps

The second component of each ISO 8583 message is the bitmap of the particular message. Each message may be composed of one or two bitmaps (If large amount of data needs to be transferred).

The primary bitmap (64 bits) is present in every message. The secondary bitmap is only present if one or more elements with the bitmap number in the ranges of 65-128 are present in the message. Bit 1 in the primary bitmap indicates the presence (1) or absence (0) of the secondary bitmap. In general, frequently used data elements are assigned bitmap number in the range of 1-64.

3. Data Element Format and Attributes

This section describes the format and attributes of data elements.

a. Attribute Type Definition

The following table describes the different attribute type describing data elements.

TABLE 3

| Attribute | Description |
|---|---|
| 'a' | Alphabetic character |
| 'b' | Bitmap |
| 'n' | Numeric |
| 'p' | Pad character, space |
| 's' | Special character |
| 'an' | Alphanumeric |
| 'as' | Alphabetic and special character |
| 'ns' | Numeric and Special character |
| 'anp' | Alphabetic, numeric and pad character |
| 'ans' | Alphanumeric and special character |
| 'z' | Track 2 data | b. Attribute Length

The following table describes units used to indicate the size of the elements.

TABLE 4

| Type | Unit |
|---|---|
| 'b' | Bit |
| 'n' | Numeric digit |
| 'z' | Track 2 digit | c. Format Definition

Data elements defined with an entry in the format columns are expressed in a following format.

TABLE 5

| Type | Description |
|---|---|
| LL | Unit length of variable data which follows (00-99) |
| LLL | Unit length of variable data which follows (000-999) |
| MM | Month (01-12) |
| DD | Day (01-31) |
| YY | Year (00-99) |
| hh | Hour (00-23) |
| mm | Minute (00-59) |
| ss | Second (00-59) |

4. System 5" Supported Data Elements

TABLE 6

| Bit | Data Element Name | Format | Attribute |
|---|---|---|---|
| 2 | Card Number | LLVAR | n..19 |
| 4 | Dollar Amount | | n12 |
| 11 | POS transaction number | | n6 |
| 12 | Time of Transmission | hhmmss | n6 |
| 13 | Date of Transaction | MMDDYY | n6 |
| 33 | Merchant Code | LLVAR | n..11 |
| 32 | Store # | LLVAR | n.11 |
| 38 | Authorization Code | | an8 |
| 39 | Approval Code | | n..3 |
| 41 | POS lane # | | ans8 |
| 42 | Cashier ID | | ans15 |
| 57 | Authorization Life Cycle Length must be 3 position 1 = unit type, 0 = no time period, 1 = days, 2 = hours, 3 = minutes position 2 and 3 set to value of period | LLLVAR | n3 |
| 58 | User defined field1 | LLLVAR | ans..100 |
| 59 | User defined field2 | LLLVAR | ans..100 |
| 60 | PIN | LLVAR | an16 |

5. System 5" Supported Response Codes

TABLE 7

| Approval Code | Description |
|---|---|
| 00 | Transaction submitted Successfully |
| 12 | Invalid Date or time |
| 13 | Invalid or missing amount. |
| 14 | Invalid or missing account number. |
| 32 | Invalid or missing Merchant Code |
| 55 | Invalid data in PIN Number field |
| 76 | Invalid data in User Defined Field 1 |
| 77 | Invalid data in User Defined Field 2 |
| 78 | Cardholder Account On Hold |
| 79 | Cardholder Account Over Velocity Limits |
| 80 | Cardholder Account Blocked |
| 91 | Issuer or switch is inoperative |
| 94 | Duplicate transaction - The transaction was accepted previously |

ISO 8583 Messages

1. Authorization Request

The authorization request message may contain the following data elements. The presence of each element will be reflected in the associated bitmap.

TABLE 8

| Bit | Element Name |
|---|---|
|  | Message Type (0200) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 41 | POS lane # |
| 42 | Cashier ID |
| 58 | User defined field1 |
| 59 | User defined field2 |
| 60 | PIN |

2. Authorization Response

The authorization response message may contain the following data elements. The presence of each element will be reflected in the associated bitmap.

TABLE 9

| Bit | Element Name |
|---|---|
|  | Message Type (0210) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

3. Pre-Authorization Request

The pre-authorization request message may contain the following data elements. The presence of each element will be reflected in the associated bitmap.

TABLE 10

| Bit | Element Name |
|---|---|
|  | Message Type (0100) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 41 | POS lane # |
| 42 | Cashier ID |
| 57 | Authorization Life Cycle |
| 58 | User defined field1 |
| 59 | User defined field2 |
| 60 | PIN |

4. Pre-Authorization Response

The pre-authorization response message may contain the following data elements. The presence of each element will be reflected in the associated bitmap.

TABLE 11

| Bit | Element Name |
|---|---|
|  | Message Type (0110) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

5. Completion Request

The pre-authorization completion request message may contain the following data elements. The presence of each element will be reflected in the associated bitmap.

TABLE 12

| Bit | Element Name |
|---|---|
|  | Message Type (0220) |
|  | Primary Bitmap |
| 2 | Card Number |
| 4 | Dollar Amount |
| 11 | POS transaction number (from 0100 message) |
| 12 | Time of Transmission (From 0100 message) |
| 13 | Date of Transaction (From 0100 message) |
| 32 | Store # |
| 33 | Merchant Code |
| 38 | Authorization Code (From 0110 message) |
| 39 | Approval Code (From 0110 message) |
| 41 | POS lane # |
| 42 | Cashier ID |
| 58 | User defined field1 |
| 59 | User defined field2 |
| 60 | PIN |

6. Completion Response

The pre-authorization completion response message may contain the following data elements. The presence of each element will be reflected in the associated bitmap.

TABLE 13

| Bit | Element Name |
|---|---|
|  | Message Type (0210) |
|  | Primary Bitmap |
| 2 | Card Number |
| 4 | Dollar Amount |
| 11 | POS transaction number |
| 12 | Time of Transmission |
| 13 | Date of Transaction |
| 32 | Store # |
| 33 | Merchant Code |
| 38 | Authorization Code |
| 39 | Approval Code |
| 41 | POS lane # |
| 42 | Cashier ID |
| 58 | User defined field1 |
| 59 | User defined field2 |

Other systems and options for enrollment and transaction processes may be found in U.S. Application Ser. No. 60/724,806 of JOSEPH R. RANDAZZA AND DANILO PORTAL FOR filed Oct. 11, 2005 for PAYMENT SYSTEMS AND METHODS, the contents of which are herein incorporated by reference.

EXAMPLE 4

Figure 11:
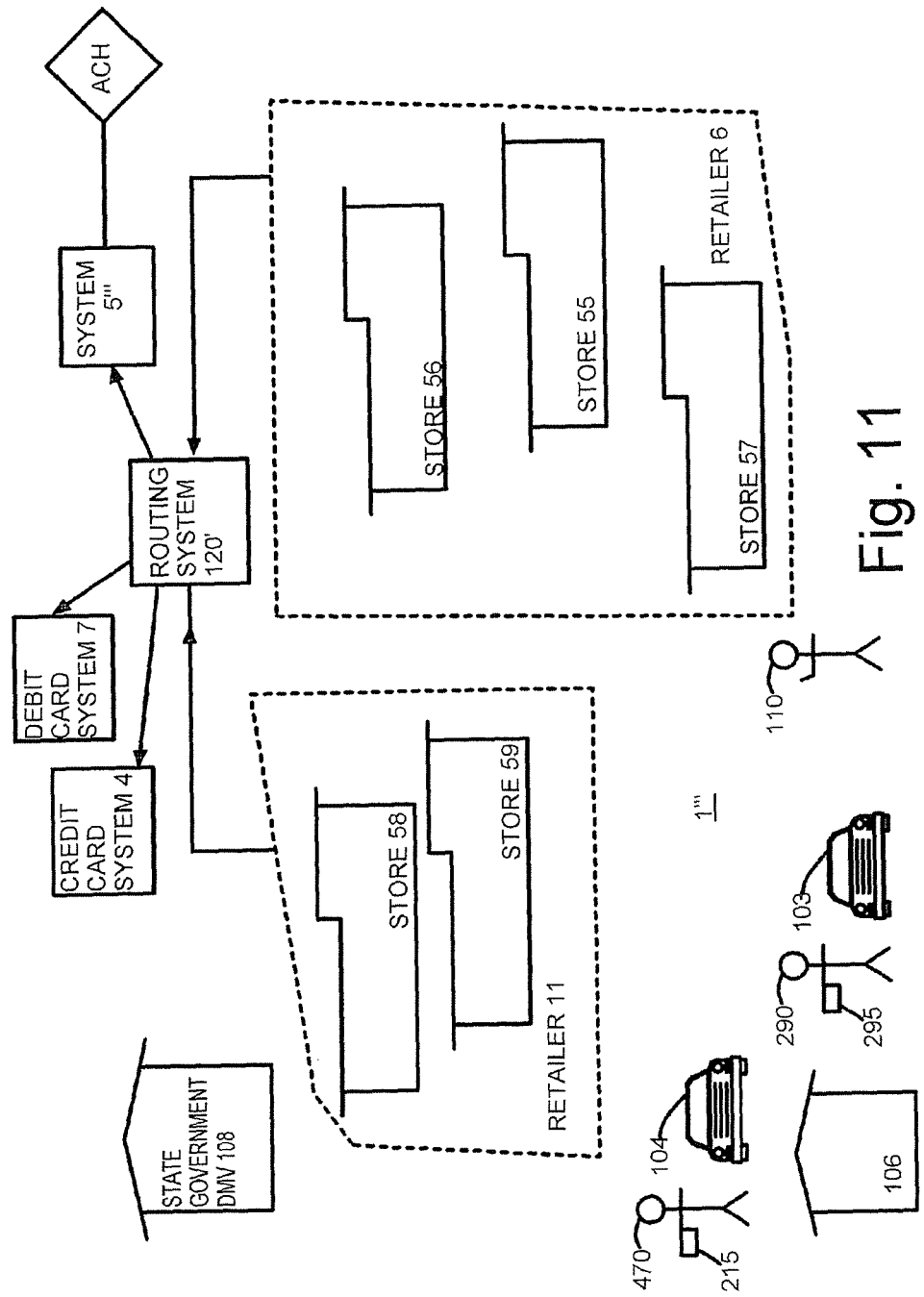
FIG. 11 shows a system according to a fourth exemplary embodiment.

FIG. 11 shows exemplary system 1''' including system 5''' according to a fourth exemplary embodiment of the present invention. System 5''' has all the circuitry for effecting the functionality of system 5 in the first preferred embodiment. System 5''' has circuitry to perform additional processing, including a retailer-specific velocity check as described below. Velocity thresholds may vary with the retailer or type of industry. For example, the threshold for grocery stores may be different from the threshold for gas stations.

FIG. 12 is a representation of a data structure 181 in system 1'. Data structure 181 is in a disk-resident database in system 5'''. Each row in data structure 181 represents an association between a card ID and a set of velocity thresholds. Each threshold corresponds to a retailer set. A retailer set may contain one or more retailers.

In this example, the first column after card ID is a velocity threshold for a grocery retailer set, the second column is a velocity threshold for a gas station retailer set, and the third column is a velocity threshold for another set of retailers.

A retailer may be alone in its own set.

A retailer may belong to more than one set.

Thus, system 1''' may have a threshold specific to a particular retailer. The system may also have a threshold specific to a market sector, encompassing multiple retailers. For examples, the system may have a threshold that is compared to the sum of gasoline purchases occurring in the Texaco™, Sonoco™, and other gasoline stations.

FIG. 13 shows data structure 183 representing the sets corresponding to the columns of FIG. 12. Each row in data structure 183 represents a retailer set. Each retailer set includes one or more retailers.

Figures 14, 15:
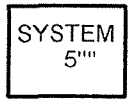
FIG. 14 shows another data structure in an exemplary system.
FIG. 15 shows a system according to a fifth exemplary embodiment.

FIG. 14 shows data structure 185 storing a transaction history for each card ID. Each row of data structure 185 represents a transaction.

For example, customer 470 buys gas by presenting card 215, either at the payment terminal 132 or elsewhere in the gas station. The gas station circuitry reads the ID information from card 215. A server in retailer 6 recognizes the identification number of card 215 to be that of a system-5'''-registered card and, in response to this recognition, sends the identification number of card 215 to system 5'''.

Circuitry in system 5''' uses the ID number of the card to select a row in data structure 181. Circuitry in system 5' uses the retailer ID to select a row in data structure 183, thereby selecting a retailer set. The selected retailer set thereby determines a column in data structure 181, thereby selecting a velocity threshold for this consumer at this retail site (row 3, column 3 of data structure 181).

System 5''', for a given transaction date range in data structure 185, adds the transaction amounts for the retailer IDs that are present in the list of the row selected data structure 183. System 5''' conditionally responds to the server in retailer 6 with a card-authorized signal, or a card-not-authorized signal, depending upon whether the sum is above the velocity threshold for this consumer at this retail site.

If the server receives a card-authorized signal, the transaction proceeds and the server then transmits a transaction amount to system 5'''. Circuitry in system 5''' then adds a row, to data structure 185, to record the transaction that just occurred in retailer 6.

EXAMPLE 5

FIG. 15 shows exemplary system 5'''' according to a fifth exemplary embodiment of the present invention. System 5'''' has all the circuitry for effecting the functionality of system 5 in the first preferred embodiment. System 5'''' has circuitry to perform additional processing, including selecting from multiple accounts associated with a common card as described below.

FIG. 16 is a representation of a data structure 187 in system 5''''. Data structure 187 is a disk resident database in system 5''''. Each row in data structure 187 is an association between a card ID and one or more account numbers associated with the card ID, and a respective PIN number associated with each account.

System 5'''' has circuitry to select the account depending upon the PINT entered at the POS.

In an enrollment process, circuitry receives personal ID information from a driver license; and receives information corresponding to multiple accounts, each account corresponding to a respective first number (account number) previously displayed to a user, on a bank statement for example. System 5'''' stores a link between the ID information and the account information.

To effect the transaction at retailer 6, system 5'''' receives the ID information from the driver license, and receives a PIN from the holder of the license. System 5'''' uses the received ID information to debit a selected one of the accounts, the account being selected by the second number (PIN).

The account number has more digits than the PIN. The account number presented to the user on a paper statement, and the PIN is selected by the user. The account number has a first number of digits, and the PIN has a second number of digits less than the first number of digits. The first number of digits is at least 12, and the second number of digits is at least 4.

EXAMPLE 6

In this inventive example, Examples 1-5 generally are repeated, except for use of a mobile phone that comprises payment token 1700.

At the retail site, the equipment accommodates that the shopper 1701's mobile phone is the payment token 1700.

Pre-shopping enrollment takes into account that shopper 1701 will be using a mobile phone as the payment token 1700. When shopper 1701 who has a US checking account is being enrolled to use his mobile phone to pay at retail sites, information is received from shopper 1701 by which his US checking account number is associated with the telephone number of his mobile phone, with such data for shopper 1701 being stored in a database.

After so enrolling, shopper 1701 takes his mobile phone comprising the payment token 1700 to the retail site, and uses his mobile phone to accomplish funds settlement via a financial institution to send an ACH entry to the Federal Reserve ACH system, resulting in an account being issued a debit and a related transfer of funds to the owner of the retail site.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept.

What we claim as our invention is:

1. An automated system comprising at least one computer, wherein the system performs the following steps, wherein each step is performed by a computer:
   receiving at least one signal from a card;
   sending the signal received from the card into a routing system;
   after the sending step, receiving a signal, and depending on the signal received, conditionally effecting a transaction with a holder of the card.

2. The automated system of claim 1, wherein the system further performs, by a computer, the following steps:
   conditionally sending a message to cause an institution to send an ACH entry to the Federal Reserve ACH system, to pass the entry to a bank, where an account is issued a debit, to cause a transfer of funds to an owner of a retail site where the signal was received from the card.

3. The automated system of claim 2, further comprising a point of sale terminal via which the signal from the card is received.

4. The automated system of claim 1, further comprising an in-retailer server.

5. The automated system of claim 1, further comprising telecommunications hardware.

6. The automated system of claim 1, further comprising a translator device.

7. An automated system comprising:
   a point of sale terminal;
   a computer that performs steps of receiving at least one signal from a card; sending the signal received from the card into a routing system; and, after the sending step, receiving a signal, and depending on the signal received, conditionally effecting a transaction with a holder of the card.

8. The automated system of claim 7, further comprising an in-retailer server.

9. The automated system of claim 7, further comprising telecommunications hardware.

10. The automated system of claim 7, further comprising a translator device.

11. An automated system comprising:
    a point of sale terminal via which a signal from a card is received;
    a computer that performs a step of conditionally sending a message to cause an institution to send an ACH entry to the Federal Reserve ACH system, to pass the entry to a bank, where an account is issued a debit, to cause a transfer of funds to an owner of a retail site where the signal was received from the card.

12. The automated system of claim 11, further comprising an in-retailer server.

13. The automated system of claim 11, further comprising telecommunications hardware.

14. The automated system of claim 11, further comprising a translator device.

* * * * *